US009873223B2

(12) United States Patent
Linnell et al.

(10) Patent No.: US 9,873,223 B2
(45) Date of Patent: Jan. 23, 2018

(54) SHIFTING A CURING LOCATION DURING 3D PRINTING

(71) Applicant: X Development LLC, Mountain View, CA (US)

(72) Inventors: Jeffrey Linnell, San Francisco, CA (US); Brandon Kruysman, San Francisco, CA (US); Jonathan Proto, San Francisco, CA (US)

(73) Assignee: X Development LLC, Mountain View, CA (US)

( * ) Notice: Subject to any disclaimer, the term of this patent is extended or adjusted under 35 U.S.C. 154(b) by 592 days.

(21) Appl. No.: 14/523,214

(22) Filed: Oct. 24, 2014

(65) Prior Publication Data

US 2016/0096331 A1 Apr. 7, 2016

Related U.S. Application Data

(60) Provisional application No. 62/059,951, filed on Oct. 5, 2014.

(51) Int. Cl.
*B29C 67/00* (2017.01)
*B29C 64/124* (2017.01)
(Continued)

(52) U.S. Cl.
CPC .......... *B29C 64/124* (2017.08); *B29C 64/106* (2017.08); *B29C 64/386* (2017.08);
(Continued)

(58) Field of Classification Search
CPC ............ B29C 67/0062; B29C 67/0066; B29C 67/007; B29C 64/124; B29C 64/129;
(Continued)

(56) References Cited

U.S. PATENT DOCUMENTS 8,521,319 B2 8/2013 Schmidt et al.
2001/0048183 A1 12/2001 Fujita
(Continued)

FOREIGN PATENT DOCUMENTS

EP 0379068 A2 7/1990
WO 14/006399 A1 1/2014

OTHER PUBLICATIONS

International Search Report and Written Opinion for corresponding PCT application No. PCT/US2015/053946 dated Dec. 23, 2015.

*Primary Examiner* — Timothy Kennedy
(74) *Attorney, Agent, or Firm* — Fish & Richardson P.C.

(57) ABSTRACT

Example implementations may relate to shifting a curing location during a three-dimensional (3D) printing procedure. A system may control components of a 3D printer to form a first layer of the 3D structure from resin in a first area of a resin container. The components may include: (i) a base plate and (ii) light source(s) operable to emit radiation that cures resin. After formation of the first layer, the system may move the resin container with respect to the base plate such that a second layer of the 3D structure can be formed in a second area of the resin container. The second area and the first area may be at least partially non-overlapping. The system may then control the components of the 3D printer to form the second layer of the 3D structure from resin in the second area of the resin container.

13 Claims, 18 Drawing Sheets

(51) Int. Cl.
*B33Y 10/00* (2015.01)
*B33Y 30/00* (2015.01)
*B29C 64/106* (2017.01)
*B29C 64/386* (2017.01)
*B29K 83/00* (2006.01)
*B29K 105/00* (2006.01)

(52) U.S. Cl.
CPC .............. *B33Y 10/00* (2014.12); *B33Y 30/00* (2014.12); *B29K 2083/00* (2013.01); *B29K 2105/0058* (2013.01)

(58) Field of Classification Search
CPC ..... B29C 64/135; B29C 64/20; B29C 64/227; B29C 64/379
See application file for complete search history.

(56) References Cited

U.S. PATENT DOCUMENTS

| | | | |
|---|---|---|---|
| 2003/0003380 A1* | 1/2003 | Farnworth | B29C 41/48 430/18 |
| 2004/0148048 A1* | 7/2004 | Farnworth | B29C 67/0066 700/119 |
| 2006/0019216 A1 | 1/2006 | Priluck et al. | |
| 2006/0022379 A1* | 2/2006 | Wicker | B33Y 30/00 264/255 |
| 2006/0156978 A1* | 7/2006 | Lipson | A61L 27/36 118/708 |
| 2007/0008311 A1* | 1/2007 | Yoshino | B29C 64/135 345/419 |
| 2012/0106150 A1 | 5/2012 | Vaes et al. | |
| 2012/0195994 A1* | 8/2012 | El-Siblani | B29C 67/007 425/174.4 |
| 2013/0015596 A1* | 1/2013 | Mozeika | B25J 9/0084 264/40.1 |
| 2013/0295212 A1* | 11/2013 | Chen | B29C 67/0088 425/150 |
| 2013/0304233 A1 | 11/2013 | Dean et al. | |
| 2014/0107823 A1 | 4/2014 | Huang | |
| 2014/0197576 A1* | 7/2014 | Kraibuhler | B29C 67/0059 264/308 |
| 2014/0232035 A1* | 8/2014 | Bheda | B29C 67/0088 264/148 |
| 2014/0252668 A1* | 9/2014 | Austin | B28B 3/20 264/40.7 |
| 2014/0284832 A1* | 9/2014 | Novikov | B29C 67/0088 264/40.1 |

\* cited by examiner

SHIFTING A CURING LOCATION DURING 3D PRINTING

CROSS REFERENCE TO RELATED APPLICATION

The present application claims priority to U.S. Provisional patent application Ser. No. 62/059,951 filed on Oct. 5, 2014 and entitled "Shifting a Curing Location During 3D Printing," the entire contents of which are herein incorporated by reference.

BACKGROUND

Three-Dimensional ("3D") printing is an additive manufacturing procedure in which successive layers of material are laid down on top of each other to form a solid 3D object. Over time, various types of 3D printing procedures have been developed, including extrusion-based 3D printing (e.g., fused deposition modeling (FDM)), and procedures based on light polymerization, such as stereolithography (SLA) and digital light processing (DLP), among others.

In stereolithography procedures, a 3D structure is built up one layer at a time, with each layer being formed by exposing a photo-reactive resin to an ultraviolet (UV) light source that cures the resin. Note that stereolithography may also be referred to as optical fabrication, photo-solidification, and/or solid free-form fabrication and solid imaging.

More specifically, in a typical stereolithography procedure, a digital 3D model of an object is created by a user via the software interface of a 3D printing application. The 3D printing application then slices the 3D model with a set of horizontal planes. Each slice of the 3D model can then be converted to a two-dimensional mask image, such that the 3D model is represented as a sequence of two-dimensional mask images, which each outline the shape of the corresponding layer from the 3D model. The mask images are sequentially projected onto a photo-curable liquid or powders resin surface while light is projected onto the resin to cure it in the shape of the layer. Alternatively, instead of using masks, each slice of the 3D model may be represented by a two-dimensional image in the shape of the slice, so that a projector can project a sequence of such two-dimensional images onto the resin surface to form an object corresponding to the digital 3D model.

SUMMARY

During the stereolithography process, the quality of the liquid resin (and/or a membrane positioned at the bottom of a resin container) may degrade to exposure to air and/or ultraviolet (UV) radiation. This may lead to material waste and may increase the cost of the 3D printing procedure. Example embodiments may help to address such issues by shifting a curing location within a resin container of liquid resin during the process of 3D printing an object.

More specifically, to reduce degradation of the liquid resin (and/or the membrane), the disclosed implementations involve shifting a location in the resin container of liquid resin where each layer of the 3D structure is formed (i.e., cured). Shifting the location may involve, for example, movement of the resin container relative to a base plate that holds the "in-progress" 3D structure. For instance, after formation of a first layer, the resin container may move such that a subsequent layer may form in an area of the resin container that is different from the area where the first layer was formed. Such movement of the resin container may stir the entire (or part of) the volume of the liquid resin in the resin container and may avoid repeated curing at the same location, thereby reducing degradation of the resin (and/or the membrane).

In one aspect, a method for printing a three-dimensional (3D) structure is provided. The method involves controlling, by a computing system, one or more components of a 3D printer to form a first layer of the 3D structure from resin in a first area of a resin container, where the one or more components includes one or more of: (i) a base plate, where the resin container is movable with respect to the base plate, and (ii) one or more light sources operable to emit radiation that cures resin. The method also involves, after formation of the first layer, moving the resin container with respect to the base plate such that a second layer of the 3D structure can be formed in a second area of the resin container, where the second area and the first area are at least partially non-overlapping. The method additionally involves controlling, by the computing system, the one or more components of the 3D printer to form the second layer of the 3D structure from resin in the second area of the resin container.

In another aspect, a system is provided. The system includes a base plate configured to support a three-dimensional structure. The system also includes a resin container that is movable with respect to the base plate. The system additionally includes one or more light sources operable to emit radiation that cures resin in the resin container. The system further includes a control system that is operable to generate control signals that coordinate movement of at least the resin container to form the three-dimensional structure from layers of the resin. The generated control signals include control signals that: (a) cause a first layer of the three-dimensional structure to be formed from resin in a first area of the resin container, (b) after formation of the first layer, cause the resin container move with respect to the base plate such that a second layer of the three-dimensional structure is formed from resin in a second area of the resin container, where the second area and the first area are at least partially non-overlapping, and (c) cause the second layer of the three-dimensional structure to be formed from resin in the second area of the resin container.

In yet another aspect, a non-transitory computer readable medium is provided. The non-transitory computer readable medium has stored therein instructions executable by one or more processors to cause a computing system to perform functions. The functions include controlling one or more components of a 3D printer to form first layer of the 3D structure from resin in a first area of a resin container, where the one or more components comprise one or more of: (i) a base plate, where the resin container is movable with respect to the base plate, and (ii) one or more light sources operable to emit radiation that cures resin. The functions also include, after formation of the first layer, moving the resin container with respect to the base plate such that a second layer of the 3D structure can be formed in a second area of the resin container, where the second area and the first area are at least partially non-overlapping. The functions additionally include controlling the one or more components of the 3D printer to form the second layer of the 3D structure from resin in the second area of the resin container.

In yet another aspect, another system is provided. The system may include means for controlling one or more components of a 3D printer to form first layer of the 3D structure from resin in a first area of a resin container, where the one or more components comprise one or more of: (i) a base plate, where the resin container is movable with respect to the base plate, and (ii) one or more light sources operable to emit radiation that cures resin. The system may also include means for, after formation of the first layer, moving the resin container with respect to the base plate such that a second layer of the 3D structure can be formed in a second area of the resin container, where the second area and the first area are at least partially non-overlapping. The system may additionally include means for controlling the one or more components of the 3D printer to form the second layer of the 3D structure from resin in the second area of the resin container.

These as well as other aspects, advantages, and alternatives will become apparent to those of ordinary skill in the art by reading the following detailed description, with reference where appropriate to the accompanying drawings.

DETAILED DESCRIPTION

Figure 1A:
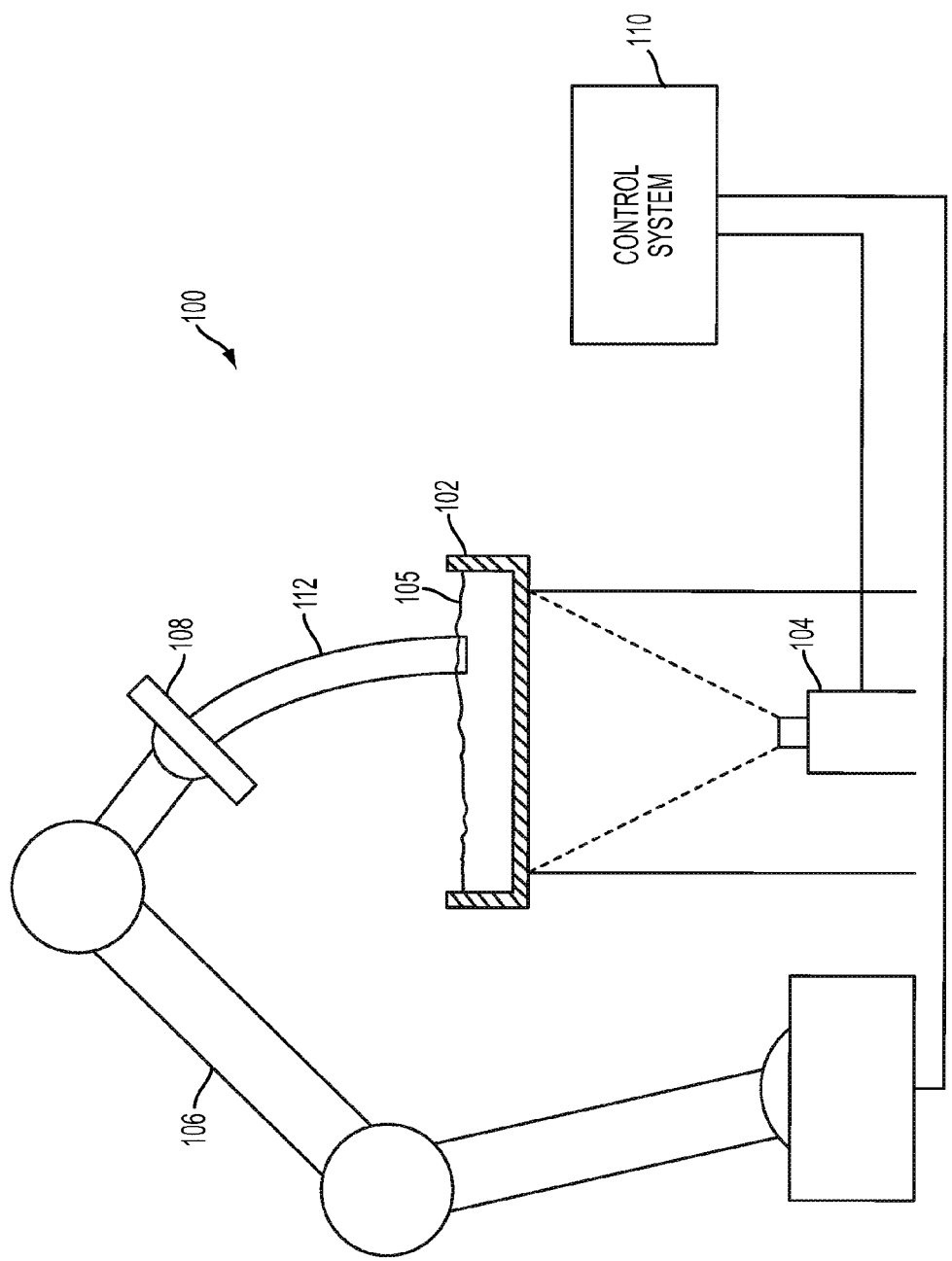
FIG. 1A illustrates a 3D printer system, according to an example implementation.

Example methods and systems are described herein. It should be understood that the words "example," "exemplary," and "illustrative" are used herein to mean "serving as an example, instance, or illustration." Any implementation or feature described herein as being an "example," being "exemplary," or being "illustrative" is not necessarily to be construed as preferred or advantageous over other implementations or features. The example implementations described herein are not meant to be limiting. It will be readily understood that the aspects of the present disclosure, as generally described herein, and illustrated in the figures, can be arranged, substituted, combined, separated, and designed in a wide variety of different configurations, all of which are explicitly contemplated herein.

I. Overview

Example implementations described herein may relate to shifting a curing location during 3D printing. When using stereolithography for 3D printing, repeatedly curing at the same location in a resin container may degrade the remaining liquid resin near the cure area. In particular, stereolithography may involve repeated exposure of synthetic polymers, such as silicon resin, to ultraviolet (UV) radiation. Such repeated exposure, while curing at the same location in the resin container, may result in degradation of the liquid silicon. For instance, the liquid resin may disintegrate into other materials (e.g., naturally occurring materials).

Degradation of the silicon resin may lead to challenges during the 3D printing procedure such as formation of a "skin" (i.e., degraded) layer at the surface of the resin, uneven degradation throughout the resin container (such as when repeatedly curing at the same location), material waste (thus increasing cost of the procedure) as well as non-uniformity of layers during formation of a 3D structure, among others.

Additionally, some 3D printing arrangements may include formation of a 3D structure from liquid resin between a base plate and a membrane that is submerged in the liquid resin and positioned at the bottom of the resin container. In particular, the membrane may be composed of a material that allows cured resin to not significantly adhere to such a material, which thus allows for cured resin to be easily removed from the membrane once a layer is complete. As a result, the cured resin may not adhere onto the resin container.

In this arrangement, repeatedly curing at the same location of the membrane may increase the temperature at that location, which may result in cured resin adhering onto the membrane at that location. As such, pulling a layer off of the membrane at that location may result in degradation of the membrane. Further, this arrangement may result in overspill of UV radiation onto areas of the liquid resin where the 3D structure is not being formed. Such overspill while repeatedly curing at the same location may result in degradation of the liquid resin at areas of the resin container that are yet to be used for formation of layers.

To deal with these issues, it may be desirable to agitate the surface of the resin during the 3D printing procedure such as by breaking the surface tension. Specifically, repeatedly agitating the surface of the resin may help the 3D printing procedure by preventing a "skin" layer from forming at the surface of the resin, thereby increasing the uniformity of the layers in the printed 3D structure. Agitating the surface of the resin may also slow down the degradation of the resin over time. Other advantages may also be possible.

Moreover, it may also be desirable to stir the entire (or part of the) volume of the liquid resin. Stirring may spread the degradation out evenly throughout the liquid resin. This may avoid a highly degraded area near the cure location and no (or limited) degradation at other locations of the resin container (e.g., the sides of the vat). Further, in the arrangement including a membrane, this may eliminate (or reduce) degradation of the membrane and/or eliminate (or reduce) degradation of the resin due to overspill of UV radiation.

To carry out agitation of the surface as well stirring of the liquid resin, some 3D printers use a scraper (e.g., swiper blade). In particular, the scraper may be operable to move across the resin container in order to agitate the surface of the resin and/or stir the volume of the resin. The scraper may be operated to periodically agitate or "scrape" the surface of resin during the procedure of 3D printing a 3D structure, such as after the formation of each layer, or according to some predetermined interval. In some cases, the scraper may be operated manually by a human. Additionally or alternatively, the scraper may be automated (e.g., motorized), such that a control system can automatically operate the scraper during the 3D printing procedure. For instance, a control system may automatically move the scraper across the resin container after the curing of each layer is completed.

However, using a scraper in a 3D printer may be time consuming and may increase the mechanical complexity of the 3D printing system. Example implementations disclosed herein may help to reduce or prevent the degradation of the silicon resin by moving the resin container. For instance, the resin container may be moved such that the base plate is positioned at a different location relative to the resin container for curing each layer. In this manner, movement of the resin container may agitate the surface of the resin and/or sir the volume of the resin. Additionally, curing each layer in a different location of the resin container may avoid repeatedly curing at the same location, thereby reducing or eliminating degradation. Consequently, degradation of the silicon resin may be mitigated without using a scraper (or other means) to agitate the resin after each layer is cured.

II. Components of Illustrative 3D Printer System

Referring now to the figures, FIG. 1A shows a 3D printer system 100 according to an example implementation. The 3D printer system 100 includes a resin container 102 (may also be referred to as a vat), as well as one or more light sources (e.g., projector 104) arranged below the resin container 102. The projector 104 is operable to emit electromagnetic radiation towards the resin container 102 in a controlled manner, such that the electromagnetic radiation cures the resin 105 in the resin container 102. Further, 3D printer system 100 includes a robotic arm 106 having a base plate 108 attached thereto.

The robotic arm 106 is operable to position the base plate 108 above the resin container 102, and to move the base plate 108 with respect to the resin container 102 with at least two degrees of freedom (and more specifically, in the illustrated example, with six degrees of freedom), among other possible degrees of freedom. As a result, the build volume of the 3D printer system 100 extends beyond the edges of the resin container 102.

In an example implementation, the robotic arm 106 may be an articulated robot with three rotary joints, allowing the robotic arm 106 six degrees of freedom. However, more or less rotary joints are possible. Further, note that that a 3D printer system can mount the base plate 108 to various types of mechanical systems, and is not limited to robotic arms. In one example, the base plate 108 could be mounted to a two-axis head unit. In another example, the base plate 108 could be mounted to a ball mount (e.g., connected to a ceiling or another fixed body) that is operable to rotate and/or move the base plate 108. In yet another example, the base plate 108 could be mounted to in a gantry configuration for parallel movement. In yet another example, the base plate 108 could be coupled to any assembly including a belt drive or a chain drive. Other examples are also possible.

As shown in FIG. 1A, the base plate 108 may be implemented as an end effector on robotic arm 106. Further, robotic arm 106 may be programmable, such that a set of control instructions can be generated to move the robotic arm 106 in a manner that results in creation of a particular three-dimensional (3D) structure 112 on base plate 108.

Note that the 3D structure 112 may refer to an "in-progress" structure or a completed structure. An in-progress structure may include a portion of the 3D structure 112 created at a given point in time during the 3D printing procedure. Further, note that while the illustrative implementations show a particular 3D structure 112, example implementations disclosed herein may apply to any 3D structure (e.g., any shape, size, color etc.) without departing from the scope of the invention.

A base plate 108 may vary in size and/or shape, depending upon the particular implementation. Further, the base plate 108 may be formed from various materials or combinations of materials, depending upon the particular implementation. Generally, the surface of the base plate 108 may be formed from any material to which a base layer of resin 105 will adhere when cured. Further, since the base plate 108 holds the 3D structure 112 being printed from above, the size, the weight distribution, the shape, and/or the adhesive properties of the base plate's surface that faces the resin container 102, may be designed so as to provide support for certain loads (e.g., so that the base plate can hold objects up to a certain weight, shape, and/or size).

The resin container 102 may be, for example, a circular resin container. However, the resin container 102 may be of various sizes and/or shapes, depending upon the particular implementation. Further, the bottom of the resin container 102 may be formed from any material that allows for transmission of electromagnetic waves from the appropriate region of the electromagnetic spectrum for curing the resin 105, such that the appropriate electromagnetic waves emitted by projector 104 can pass through the bottom of the resin container 102 to cure the resin 105. For example, if resin 105 is an ultraviolet-curable photopolymer, then the bottom of resin container 102 may be formed from any material that ultraviolet waves can pass through. Other examples are possible.

Further, note that example implementations are not limited to the stereolithography techniques described herein. In some implementations, a laser could be used to cure the resin 105 instead of a UV light source. Further, various types of resins may be utilized, including liquid and powdered photo-curable resins, without departing from the scope of the invention. Other variations on the implementations described herein are also possible.

The projector 104 may take various forms, depending upon the particular implementation. In general, the projector 104 may be any controllable light source that emits electromagnetic waves from the appropriate region of the electromagnetic spectrum for curing the resin 105. In some implementations, the projector 104 may be controllable to emit electromagnetic radiation (e.g., UV light) that is shaped according to a particular slice of a 3D model, such that the resin 105 cures to form a layer of the 3D structure 112 having the same shape. In some implementations, the projector 104 could be a standard consumer projector having its UV filter removed. Other types of projectors are also possible.

The 3D printer system 100 may also include or be communicatively coupled to a control system 110. A control system 110 may take the form of or include executable program logic, which may be provided as part of or in conjunction with a 3D printer system 100. Such program logic may be executable to, e.g., generate control signals for the 3D printer system 100. For example, a number of program-logic modules may be included as part of a control system, such as control system 110.

In an example implementation, control system 110 may be operable to receive data include a three-dimensional (3D) model of the 3D structure 112. Based at least in part on the 3D model, control system 110 may be operable to generate control signals that coordinate movement of the base plate 108 (e.g., via control of the robotic device 106) with the operation of the projector 104 to form the 3D structure 112 specified by the 3D model in a layer-by-layer manner. In particular, each layer of resin in the 3D structure 112 is formed by exposure of resin 105 in the resin container 102 to electromagnetic radiation from the projector 104.

Figure 1B:
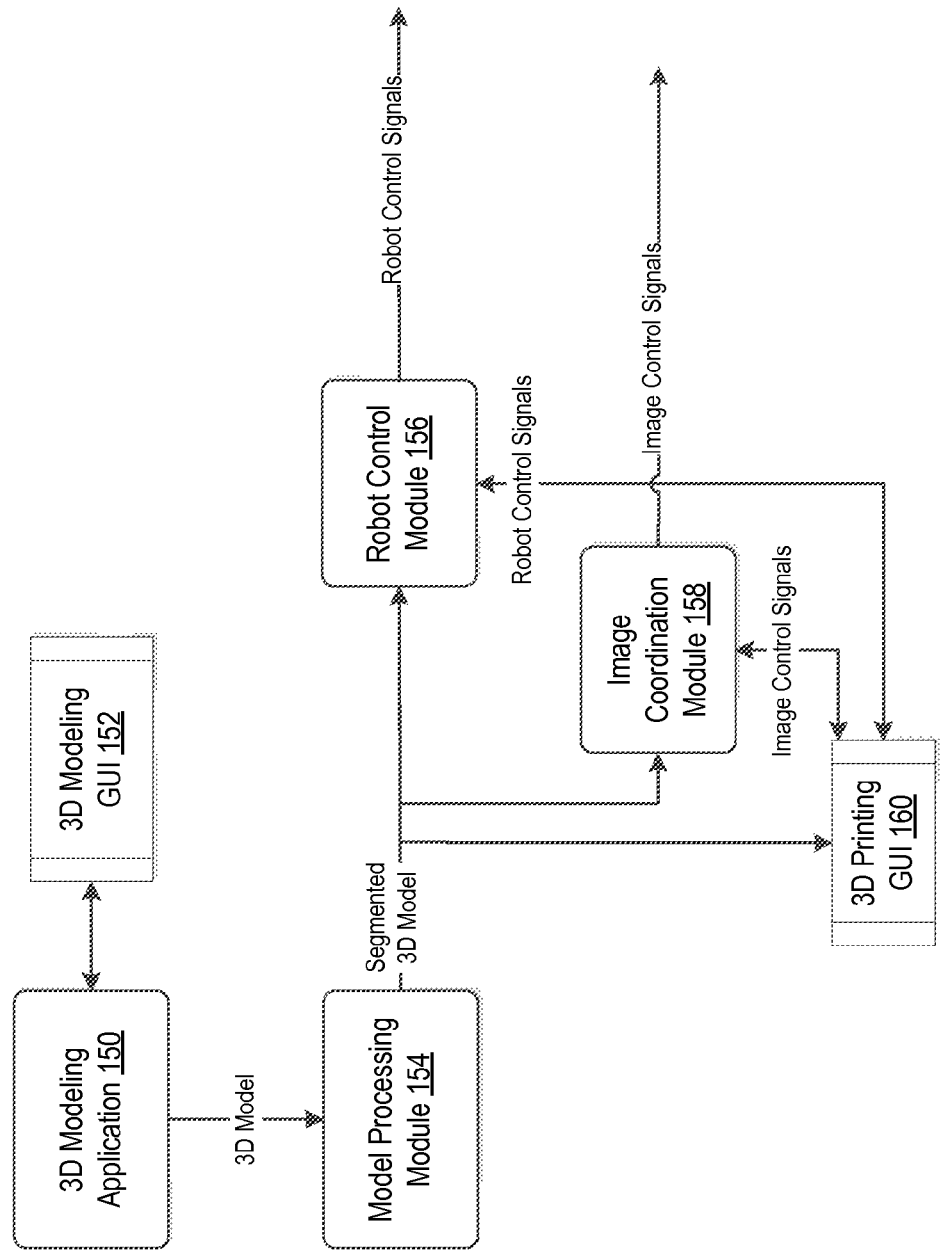
FIG. 1B illustrates example program logic modules for interfacing with and controlling a 3D printer system, according to an example implementation.

FIG. 1B shows example program logic modules for interfacing with and controlling the 3D printer system 100. In particular, a 3D-modeling application 150 and a corresponding Graphical User Interface (GUI) 152 may allow for 3D model generation. Further, to prepare the 3D model for printing, a model-processing module 154 may apply a slicing procedure to the 3D model. For example, various techniques may be used to define an isosurface mesh for a 3D model, which may then be sliced into layers. Other examples are also possible.

The slicing procedure may slice the 3D model into segments, which each correspond to a layer, such that the 3D structure 112 portrayed by the 3D model can be generated layer by layer from the segments of the 3D model. In addition, the 3D model may be sliced along non-parallel planes, such that some or all of the segments having opposing surfaces that are non-parallel.

The segmented 3D model may then be passed to both: (i) a robot-control module 156, which may generate robot control signals, and (ii) an image coordination module 158, which may generate image control signals signal for 3D printing, including image files and light-source control signals, in order to print the 3D structure 112 based on the 3D model. Further, note that the robot control module 156, the image coordination module 158, and/or other program logic modules may coordinate the timing of the robot control signals with the timing of the image control signals, so that the 3D printing procedure is properly carried out.

Additionally, a 3D printing GUI 160 may be provided. The 3D printing GUI 160 may receive data specifying the segmented 3D model, as well as data indicating robot control signals and/or image control signals. The GUI 160 may provide a 3D rendering window of the 3D model and robotic arm 106, which is updated throughout the 3D printing procedure to show the current status of the procedure. The visualization of the 3D structure 112 and the printing system in the window may be generated from a rendering environment in which the 3D structure 112 and components of the 3D printer system 100 are rendered based on respective initial coordinates, and movements within the rendering environment corresponding to the robot control instructions.

III. Example Shifting of a Curing Location During 3D Printing

Figure 2:
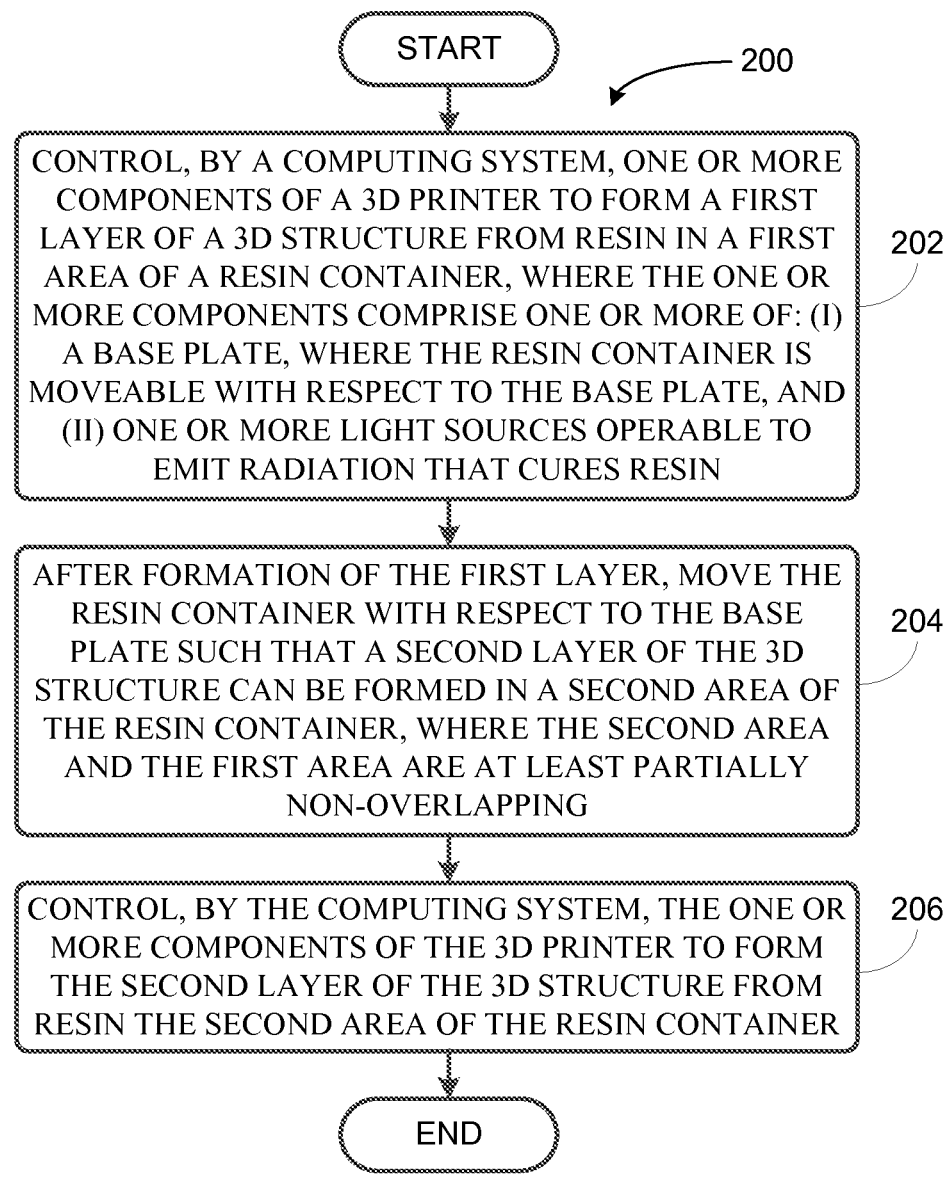
FIG. 2 illustrates an example flowchart for shifting a curing location, according to an example implementation.

FIG. 2 is a flowchart illustrating a method 200, according to an example implementation. In particular, method 200 may be implemented to shift the curing location during a 3D printing procedure.

Method 200 shown in FIG. 2 presents a method that can be implemented within an operating environment involving, for example, the 3D printer system 100 of FIGS. 1A-1B. Method 200 may include one or more operations, functions, or actions as illustrated by one or more of blocks 202-206. Although the blocks are illustrated in sequential order, these blocks may also be performed in parallel, and/or in a different order than those described herein. Also, the various blocks may be combined into fewer blocks, divided into additional blocks, and/or removed based upon the desired implementation.

In addition, for the method 200 and other processes and methods disclosed herein, the flowchart shows functionality and operation of one possible implementation of present implementations. In this regard, each block may represent a module, a segment, or a portion of program code, which includes one or more instructions executable by a processor for implementing specific logical functions or steps in the process. The program code may be stored on any type of computer readable medium, for example, such as a storage device including a disk or hard drive. The computer readable medium may include non-transitory computer readable medium, for example, such as computer-readable media that stores data for short periods of time like register memory, processor cache and Random Access Memory (RAM). The computer readable medium may also include non-transitory media, such as secondary or persistent long term storage, like read only memory (ROM), optical or magnetic disks, compact-disc read only memory (CD-ROM), for example. The computer readable media may also be any other volatile or non-volatile storage systems. The computer readable medium may be considered a computer readable storage medium, for example, or a tangible storage device. In addition, for the method 200 and other processes and methods disclosed herein, each block in FIG. 2 may represent circuitry (e.g., a control system) that is wired to perform the specific logical functions in the process.

At block 202, method 200 involves controlling, by a computing system, one or more components of a 3D printer to form a first layer of a 3D structure from resin in a first area of a resin container, where the one or more components comprise one or more of: (i) a base plate, where the resin container is movable with respect to the base plate, and (ii) one or more light sources operable to emit radiation that cures resin.

As mentioned above, control system 110 may be operable to receive data including a 3D model of the 3D structure 112, and based at least in part on the 3D model, generate control signals that coordinate movement of the base plate 108 (e.g., via control of the robotic device 106) with the operation of the projector 104 to form the 3D structure 112 specified by the 3D model in a layer-by-layer manner. Additionally, control system 110 may also be operable to generate control signals that coordinate movement of the resin container 102 with respect to the base plate 108 while forming the 3D structure 112 from the resin 105.

More specifically, a mechanical system (not shown) may be coupled to the resin container 102 and may cause movement of the resin container 102 based on the control signals. This mechanical system may be the same as the mechanical system coupled to the base plate 108 (e.g., robotic arm 106) or may be a separate system. Additionally, the mechanical system coupled to the resin container 102 may take on various forms.

In one example, the resin container 102 may be coupled to one or more motors (e.g., via a transmission assembly) configured to cause movement of the resin container 102. In another example, the resin container 102 may be coupled to a robotic arm (e.g., in addition to robotic arm 106). In yet another example, the resin container 102 could be coupled to a two-axis head unit. In yet another example, the resin container 102 could be coupled to a ball mount (e.g., that is connected to a fixed body) that is operable to rotate and/or move the base plate 108. In yet another example, the resin container 102 could be positioned in a gantry configuration for parallel movement. In yet another example, the base plate 108 could be coupled to any assembly including a belt drive or a chain drive. Other examples are also possible.

Further, movement of the resin container 102 may take on various forms. In one example, movement of the resin container 102 may include rotation of the resin container 102 about the center of the resin container 102. In another example, movement of the resin container 102 may involve horizontal (e.g., side to side) and vertical (e.g., up and down) movements of the container. In yet another example, movement of the resin container 102 may include simultaneous horizontal/vertical movement of the resin container 102 while rotating the resin container 102. Other example movements and combination of movements may also be possible.

Figure 3A:
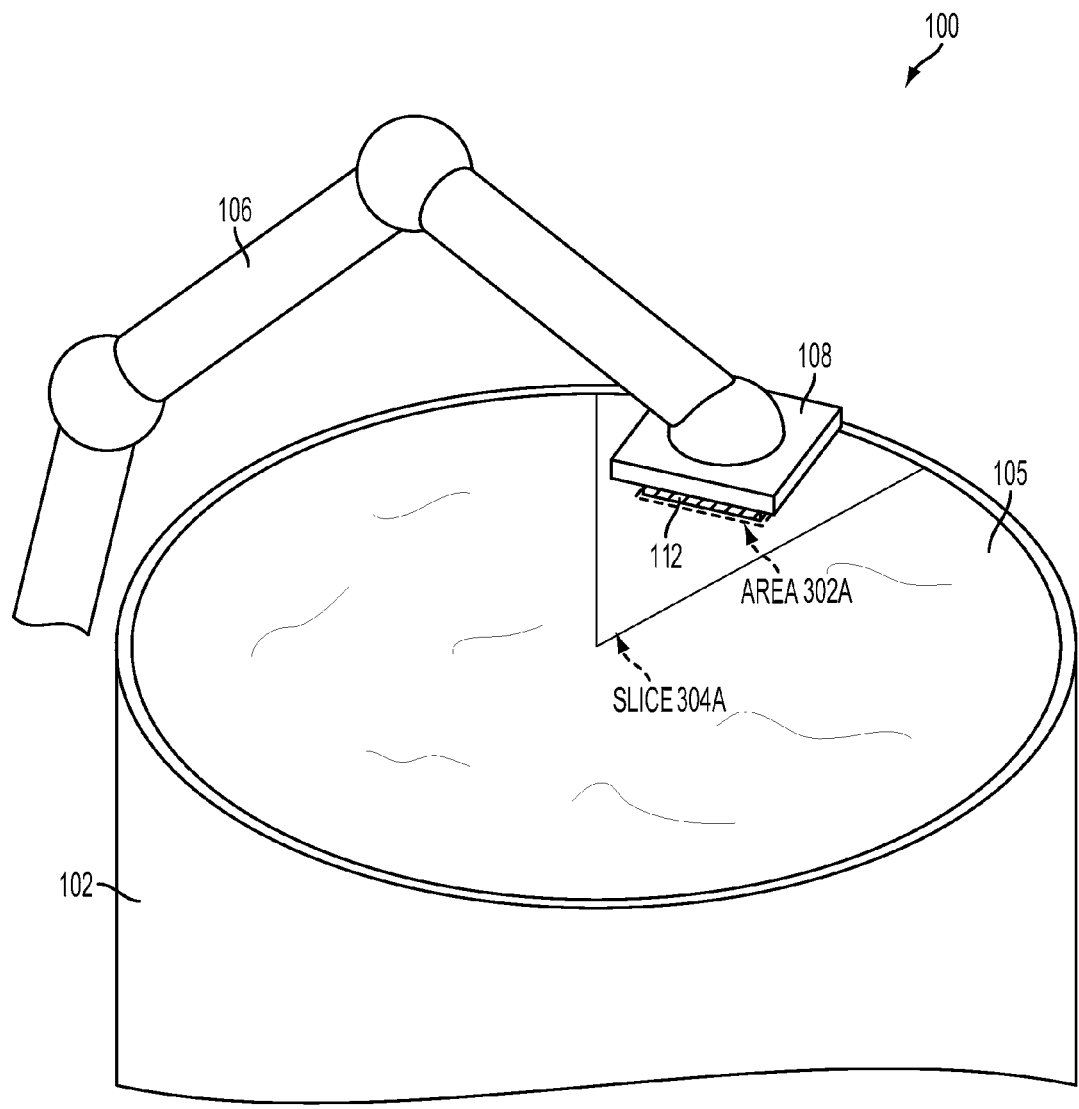
FIGS. 3A-3G illustrate a first example of shifting a curing location, according to an example implementation.

To illustrate formation of the first layer, consider FIG. 3A showing an alternative view of the 3D printer system 100 presented in FIG. 1A. As shown, the robotic arm 106 may position the base plate 108 such that a first layer of the 3D structure 112 can form from resin 105 in area 302A of the resin container 102.

Note that the base plate 108 is shown as positioned above the surface of the resin 105 for illustration purposes only. In particular, formation of a layer of the 3D structure 112 may take place at the respective areas (e.g., area 302A) discussed in association with FIGS. 3A-4G but may specifically take place towards the bottom of the resin container 102. Such an arrangement is further discussed below in association with FIG. 5. Regardless, formation of layers of the 3D structure 112 may take place at any portion of the resin container 102. Additionally, note that while the base plate 108 is shown as positioned parallel to the surface of the resin 105, the base plate 108 may be positioned in any manner. For instance, the base plate 108 may be angled relative to the surface of the resin 105 during formation of layers. In this manner, FIGS. 3A-4G are shown for illustration purposes only and are not meant to be limiting.

Area 302A may be constrained to a slice 304A of the resin container 102. In other words, the 3D printer system 100 may designate a particular region (e.g., slice 304A) of the resin container 102 for formation of the first layer. As a result, area 302A may take on the shape of the first layer of the 3D structure 112 and the robotic arm 106 may position the base plate 108 such that the first layer can form in an area 302A within the slice 304A. Subsequently, the projector 104 (not shown in FIG. 3A) may project an image in the shape of area 302A onto the base plate 108 to result in formation of the first layer. Once formation of the first layer has been completed, the control system 110 may send signals to the robotic arm 106 to cause the robotic arm 106 to move the base plate 108 with respect to the resin container 102 to a location where the 3D structure 112 (i.e., the partially formed structure) is separated from the resin 105 in the resin container 102.

Figure 3B:
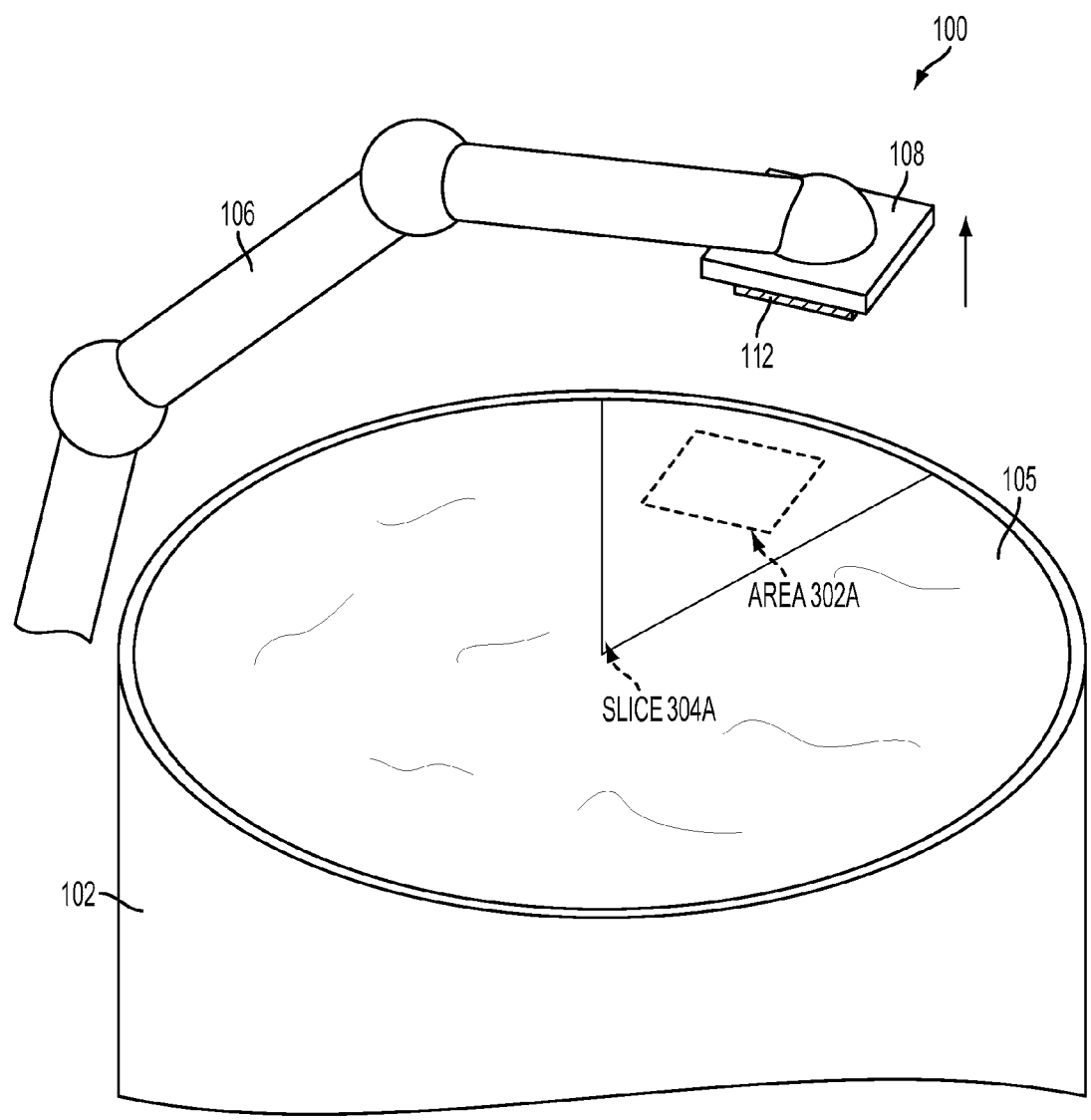

To illustrate, consider FIG. 3B depicting movement of the robotic arm 106. The arrangement illustrated in FIG. 3B shows the robotic arm 106 repositioning the base plate 108 such that the base plate 108 is lifted directly upward. In this arrangement, area 302A is shown as positioned directly under the base plate 108 upon completion of the movement. However, note that other arrangements for separating the 3D structure 112 from the resin 105 in the resin container 102 may also be possible.

At block 204, method 200 involves, after formation of the first layer, moving the resin container with respect to the base plate such that a second layer of the 3D structure can be formed in a second area of the resin container, where the second area and the first area are at least partially non-overlapping.

In an example implementation, the resin container 102 may be rotated through a predetermined angle (e.g., by 10 degrees) after forming each layer. By rotating the resin container 102 through the predetermined angle before a subsequent layer is cured, the curing location changes after each formation of each layer. Thus, the degradation of the silicon resin may be mitigated without using a swiper or another mechanical means to agitate the resin after each layer is cured.

Figure 3C:
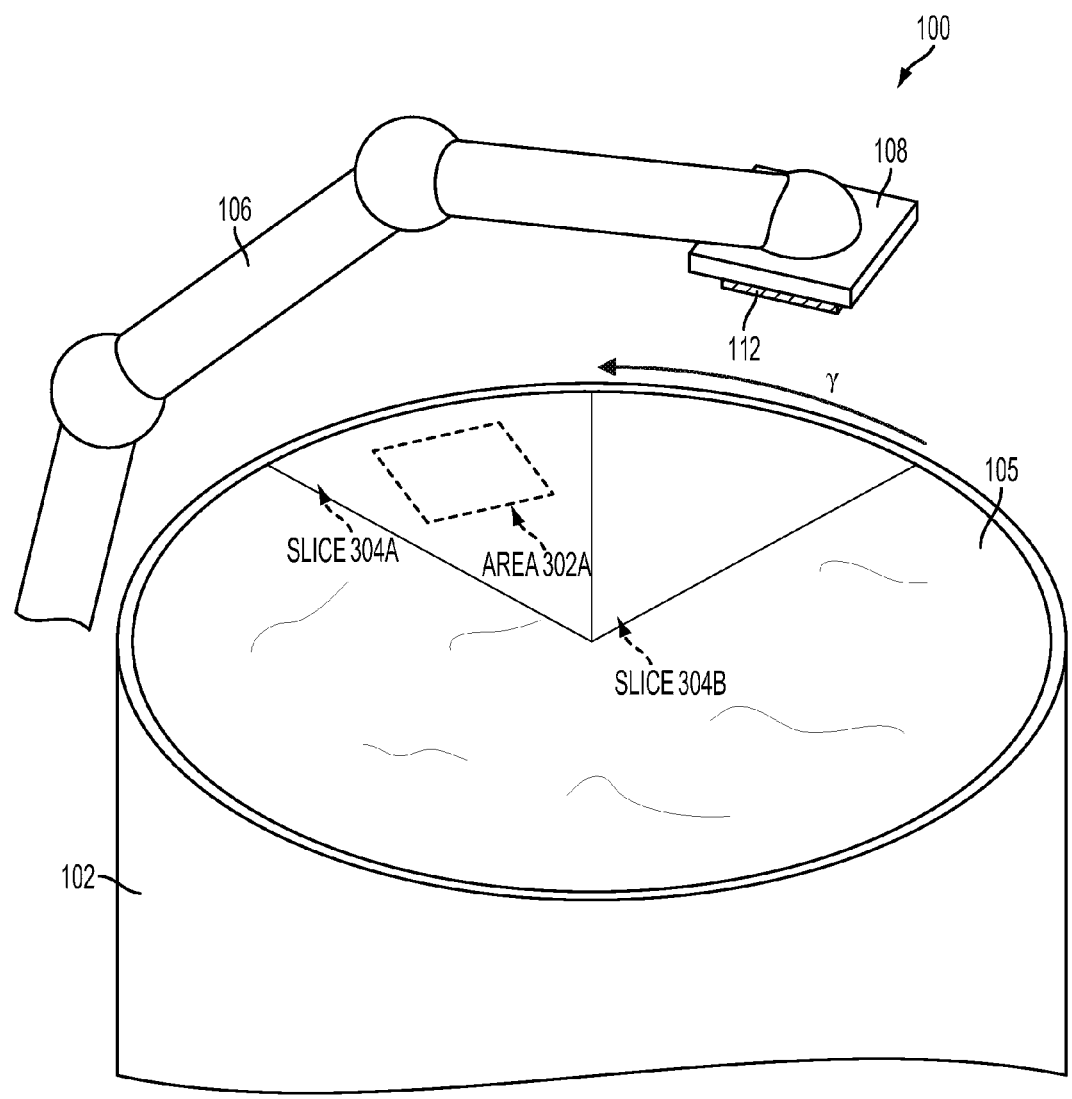

To illustrate, consider FIG. 3C depicting movement of the resin container 102. The resin container 102 is shown to rotate by an angle γ about the center of the resin container 102. However, the resin container 102 may also move in other ways (e.g., move on a horizontal plane rather than rotate). In one case, movement of the resin container 102 may occur while repositioning the base plate 108 as illustrated in FIG. 3B (e.g., simultaneously). In another case, movement of the resin container 102 may occur after repositioning of the base plate 108 (e.g., such that the base plate 108 is fixed while the resin container 102 rotates). In yet another case, the 3D printer system 100 may not reposition the base plate 108 (e.g., remaining in the position shown in FIG. 3A) and may cause movement of the resin container 102 upon completion of the first layer. Other case may also be possible.

As shown in FIG. 3C, movement of the resin container 102 may result in slice 304A (and thus the area 302A where the first layer was formed) to move to a different location relative to the base plate 108 (and/or relative to the projector 104). More specifically, the slice 304A may no longer be positioned under the base plate 108. Additionally, movement of the resin container 102 may result in a different slice 304B of the resin container 102 to be positioned under the base plate 108. The slice 304B may constrain the area where the subsequent layer forms to an area that does not overlap with area 302A.

At block 206, method 200 involves controlling, by the computing system, the one or more components of the 3D printer to form the second layer of the 3D structure from resin in the second area of the resin container.

Figure 3D:
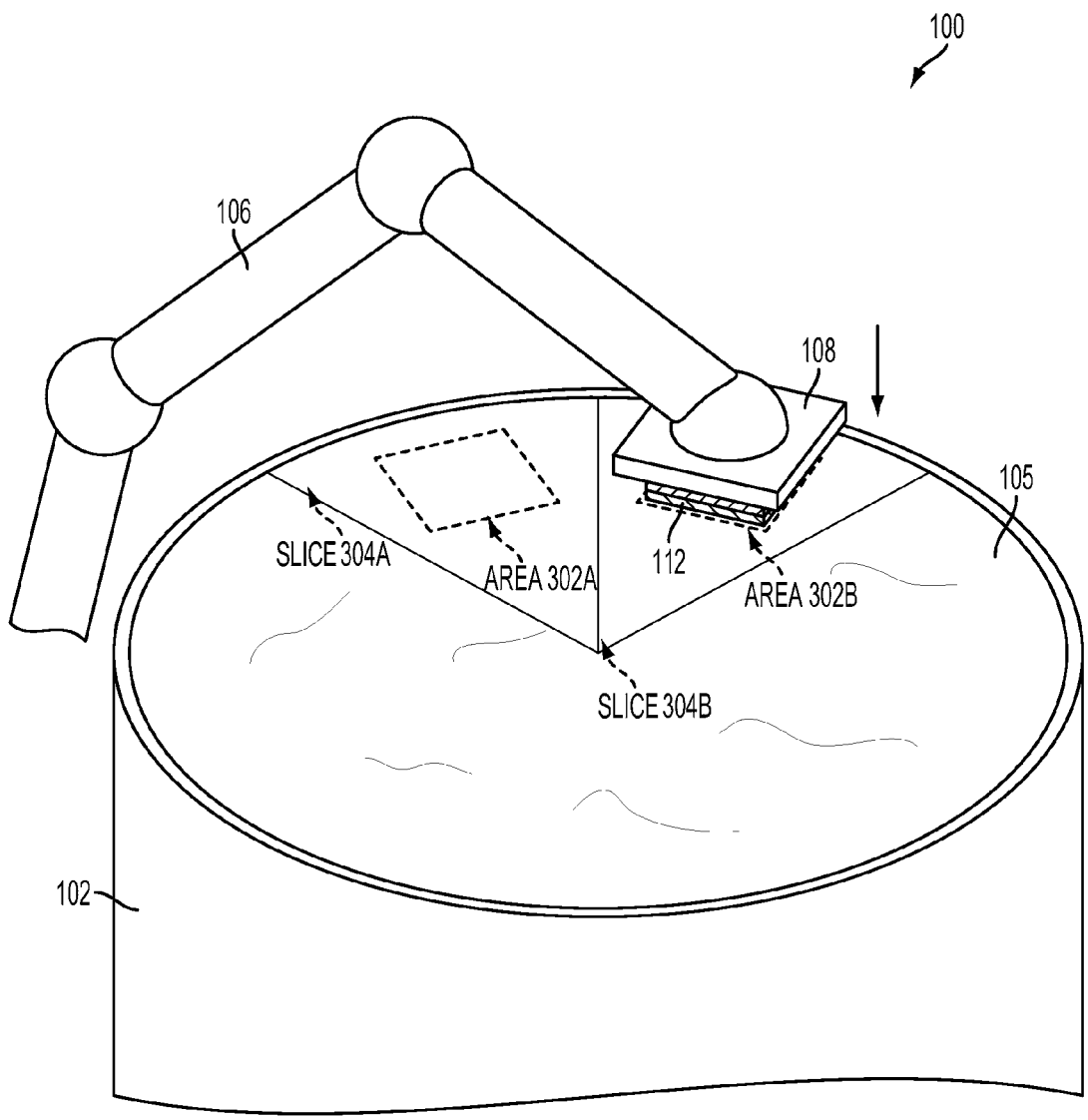

To illustrate, consider FIG. 3D depicting formation of the second layer of the 3D structure 112. In particular, after movement of the resin container 102, control signals may cause the robotic arm 106 to move the base plate 108 to a location where the 3D structure 112 (e.g., the first layer of the structure) is at least partially in contact with the resin 105 in the resin container 102 (e.g., the base plate 108 may be fully or at least partially submerged in the resin 105). For instance, as shown in FIG. 3D, the base plate 108 may move such that the second layer may form in an area 302B that is constrained within the slice 304B. As a result, area 302A and area 302B do not overlap and the second layer can form from resin 105 in an area 302B of the resin container 102 that is different from the area 302A where the first layer was formed. Subsequently, the projector 104 (not shown in FIG. 3D) may project an image in the shape of area 302B onto the base plate 108 to result in formation of the second layer.

In this manner, method 200 may extend to formation of a plurality of layers to result in the 3D structure 112. More specifically, each subsequent layer may form from resin 105 in an area of the resin container 102 that is at least partially different from an area of the resin container 102 where a preceding layer was formed. For example, consider FIGS. 3E-3G illustrating formation of a subsequent layer (e.g., a third layer) after formation of the previous layers (e.g, the first and second layers).

Figure 3E:
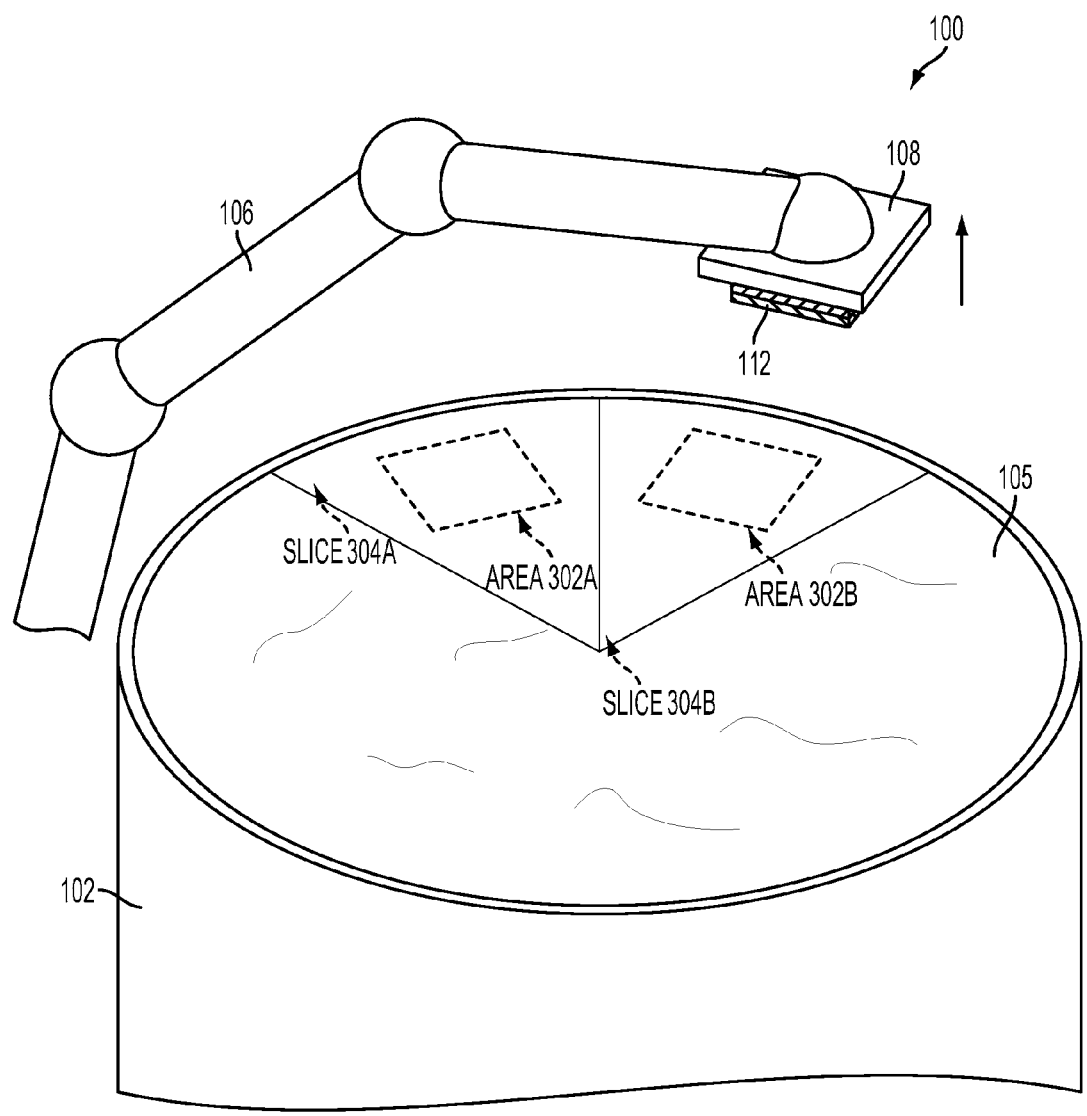
Figure 3F:
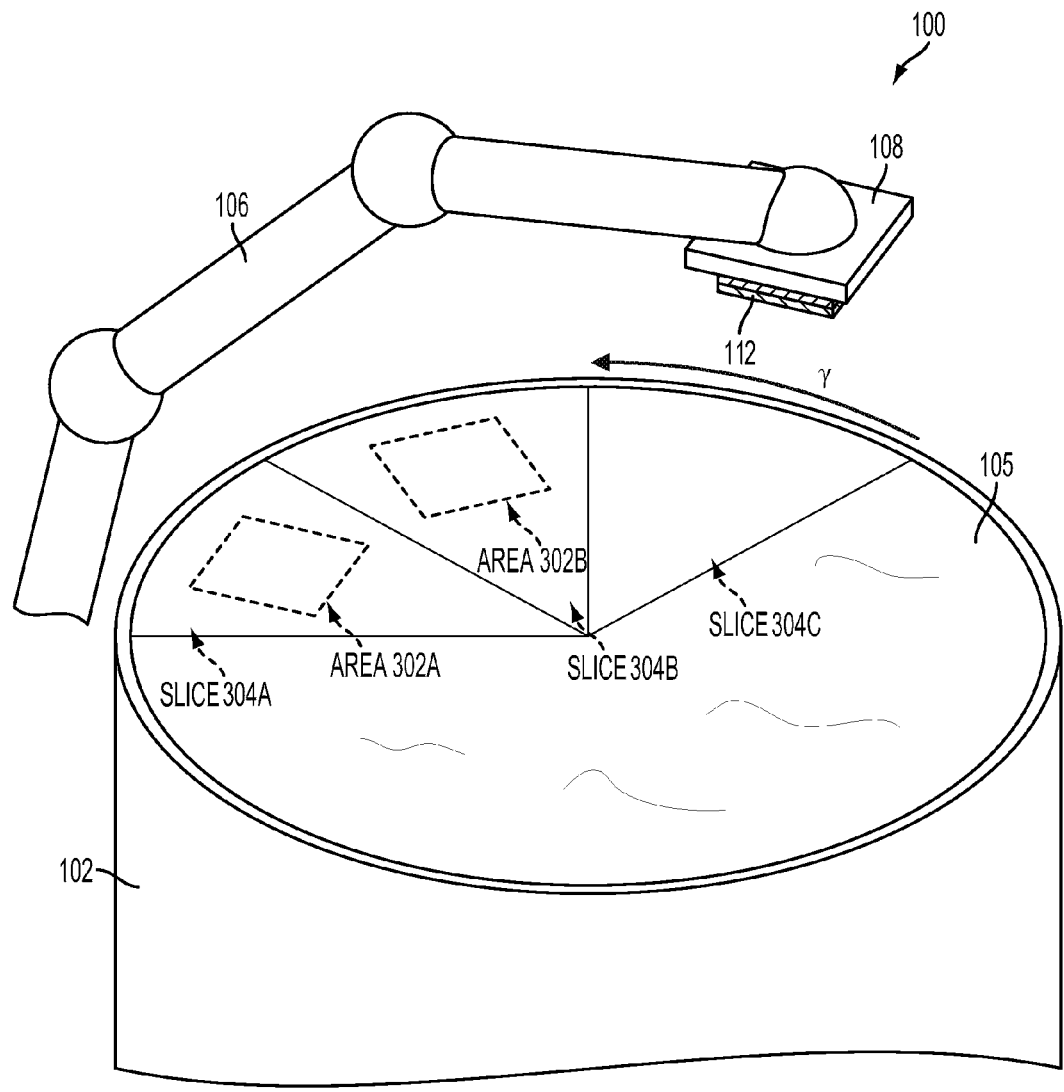
Figure 3G:
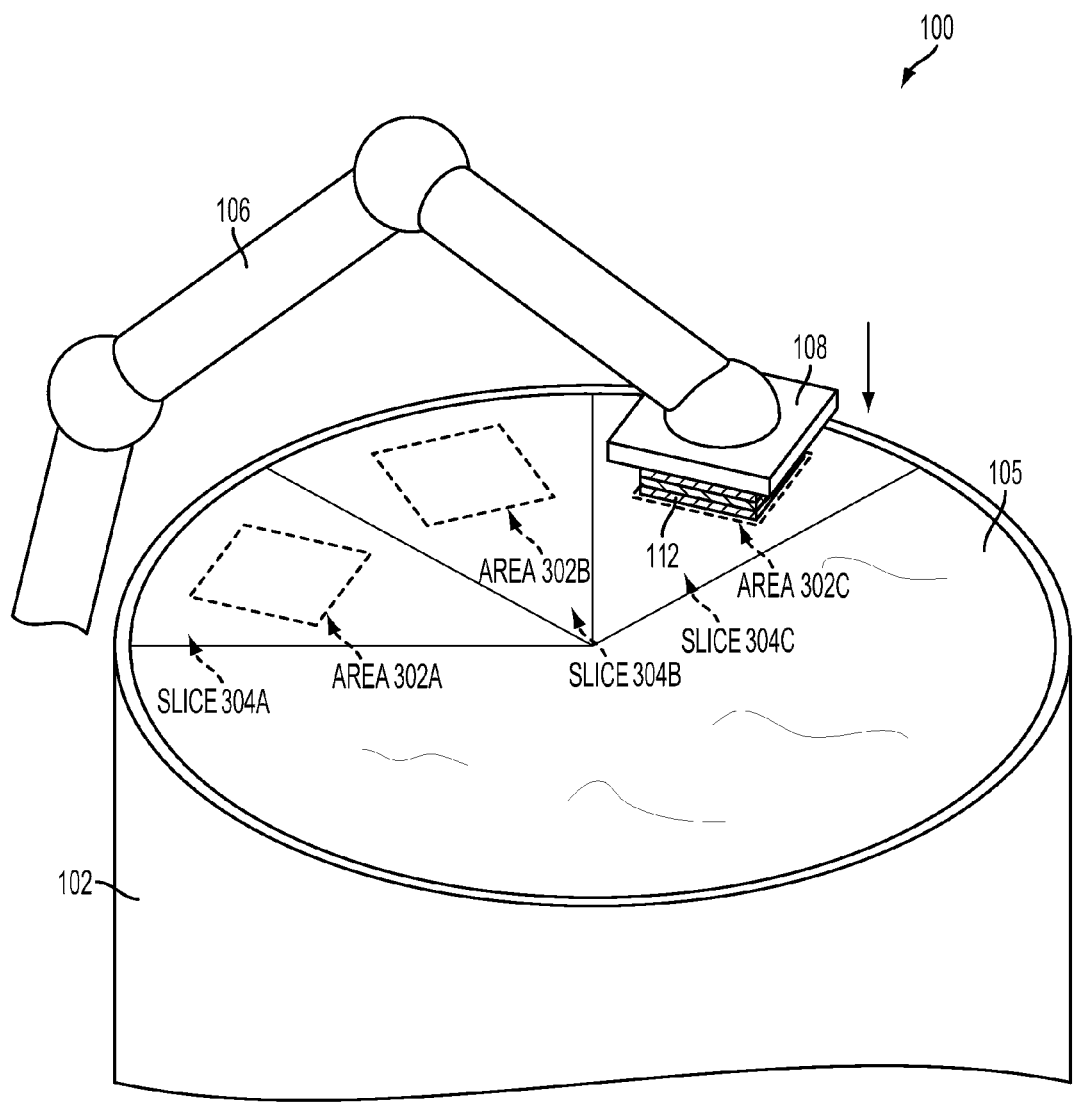

FIG. 3E depicts further movement of the robotic arm 106. In particular, the base plate 108 is lifted directly upward and area 302B is shown as positioned directly under the base plate 108 upon completion of the movement. After movement of the base plate 108, control signals may result in further movement of the resin container 102. As shown in FIG. 3F, the resin container 102 may further rotate by angle γ about the center of the resin container 102. While the resin container 102 is shown as rotating by the same angle γ as the previous rotation, the resin container 102 may rotate by a different angle.

Such movement of the resin container 102 may result in slices 304A and 304B (and thus the areas 302A and 302B where the preceding layers were formed) to move to a different location relative to the base plate 108. More specifically, the slice 304B may no longer be positioned under the base plate 108 while slice 302A is shown to move further away from base plate 108. Additionally, movement of the resin container 102 may result in another slice 304C of the resin container 102 to be positioned under the base plate 108. The slice 304C may constrain the area where the subsequent layer forms to an area that does not overlap with areas 302A and 302B.

After movement of the resin container 102, control signals may cause the robotic arm 106 to move the base plate 108 to a location where the 3D structure 112 (e.g., the first and/or second layer(s) of the structure) is at least partially in contact with the resin 105 in the resin container 102 (e.g., the base plate 108 may be fully or at least partially submerged in the resin 105). For instance, as shown in FIG. 3G, the base plate 108 may move such that the third layer may form in an area 302C that is constrained within the slice 304C. As a result, areas 302A, 302B, and 302C do not overlap and the third layer can form from resin 105 in an area 302C of the resin container 102 that is different from areas where the preceding layers were formed. Subsequently, the projector 104 (not shown in FIG. 3G) may project an image in the shape of area 302C onto the base plate 108 to result in formation of the third layer. As such, consecutive layers of the 3D structure 112 may form from resin 105 in different areas of the resin container until formation of the entire 3D structure 112 is complete.

In FIGS. 3A-3G, slices 304A-304C are depicted as regions of the resin container 102 encompassing a section spanning the amount of rotation of the resin container 102. However, in other implementations, the various "slices" may take on various shapes and size. Further, in some implementations, the area where each layer is formed may not be constrained to a "slice" of the resin container 102. In such implementations, the 3D printer system 100 may move the resin container 102 between formation of layers, without consideration of the slices, such that each layer is formed from resin 105 in an area of the resin container 102 that is at least partially different from an area where the preceding layer was formed.

Moreover, FIGS. 3A-3G illustrate printing of the 3D structure 112 where the movement of the resin container 102 after formation of each layer is such that the areas of the resin container 102 where consecutive layers are formed do not overlap. However, printing of the 3D structure 112 may also be possible such that some (or all) pairs of consecutive layers may form from resin 105 in partially overlapping areas of the resin container 102.

Figure 4A:
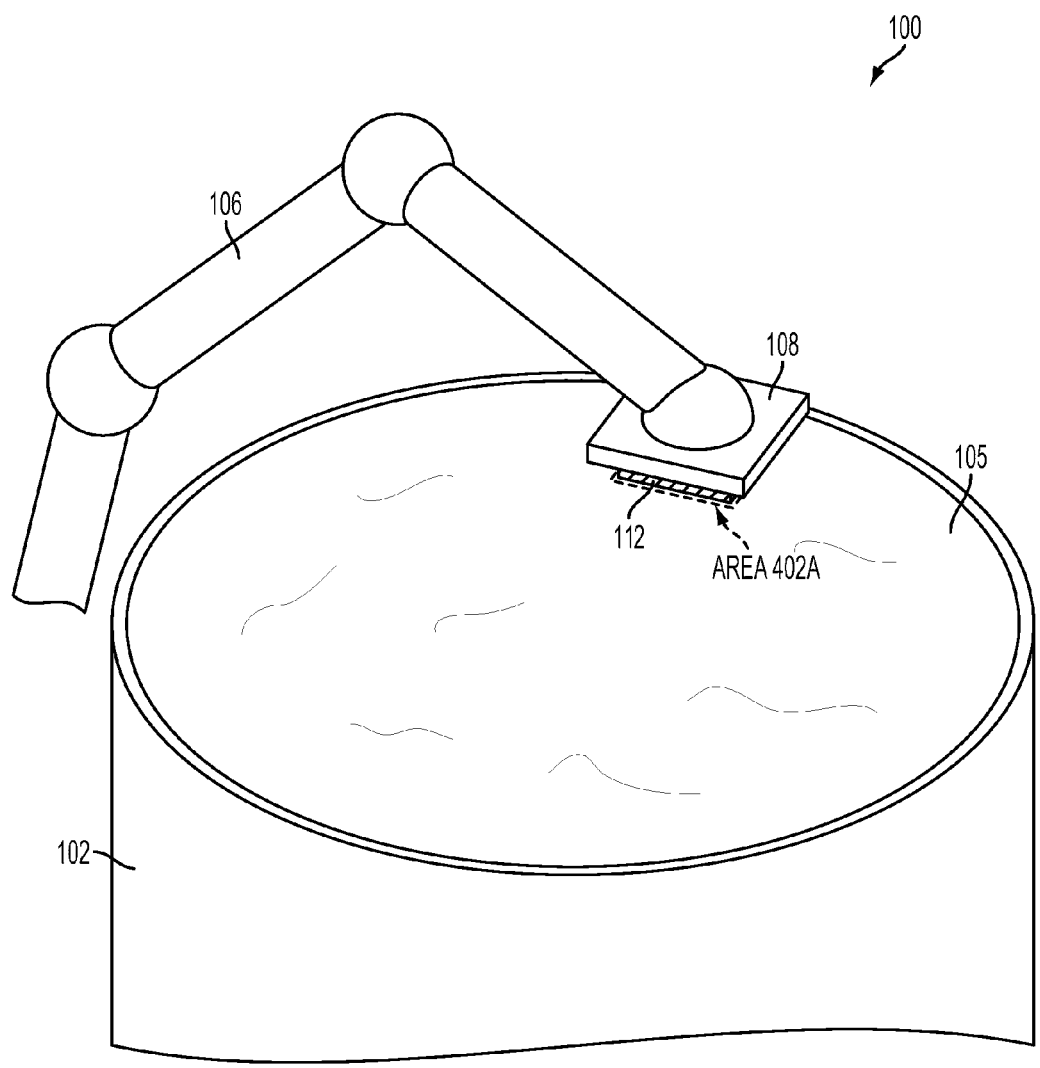
FIGS. 4A-4G illustrate a second example of shifting a curing location, according to an example implementation.
Figure 4B:
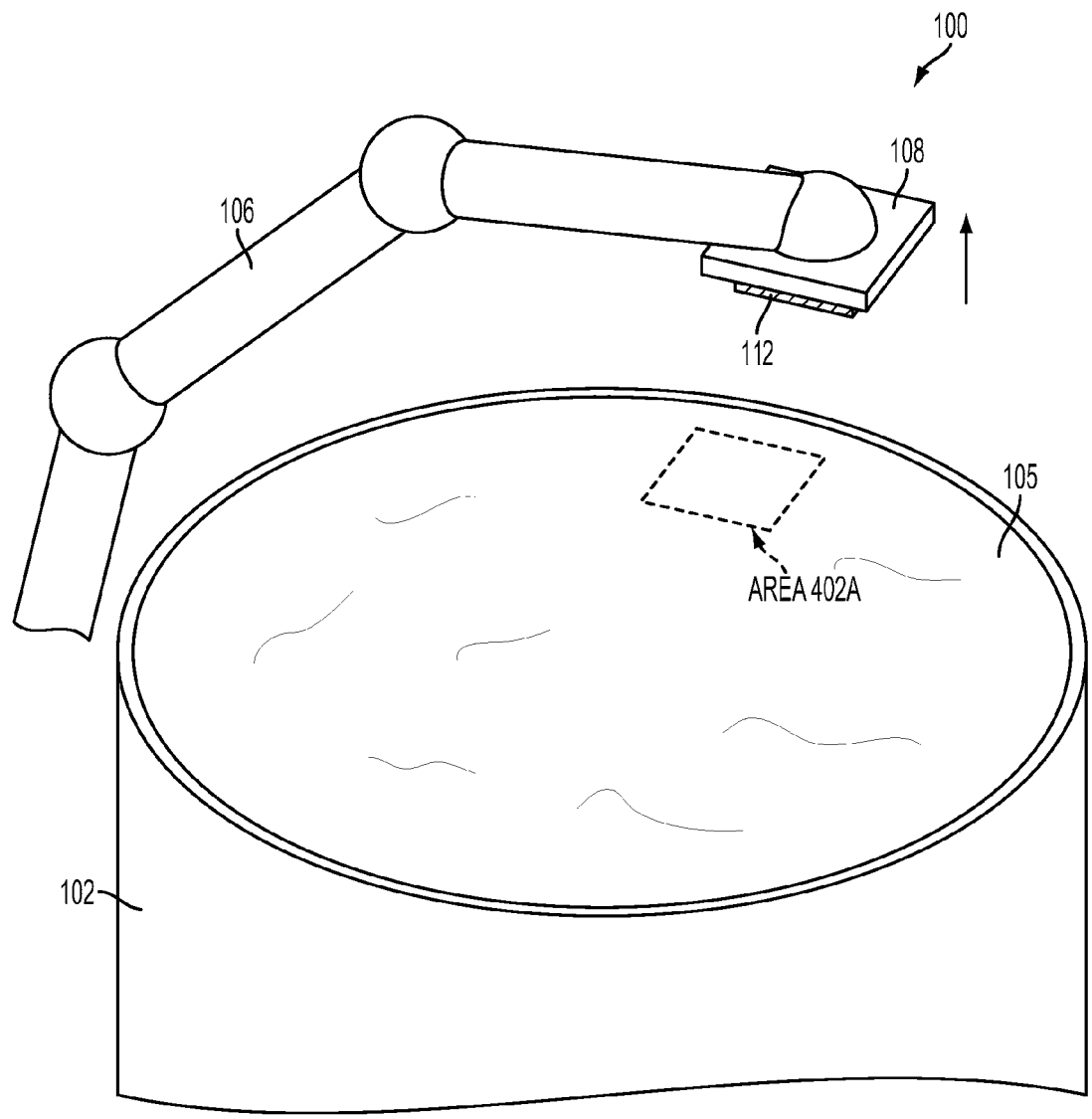

To illustrate, consider FIGS. 4A-4G illustrating operation of the example 3D printer 100 where consecutive layers are formed from resin 105 in partially overlapping areas of the resin container 102 as well as without consideration of "slices". As shown in FIG. 4A, the robotic arm 106 may position the base plate 108 such that the first layer of 3D structure 112 is formed from resin 105 in area 402A of the resin container 102. Once formation of the first layer has been completed, the control system 110 may send signals to the robotic arm 106 to cause the robotic arm 106 to move the base plate 108 with respect to the resin container 102 to a location where the 3D structure 112 (i.e., the partially formed structure) is separated from the resin 105 in the resin container 102. For instance, FIG. 4B shows the robotic arm 106 repositioning the base plate 108 such that the base plate 108 is lifted directly upward.

Figure 4C:
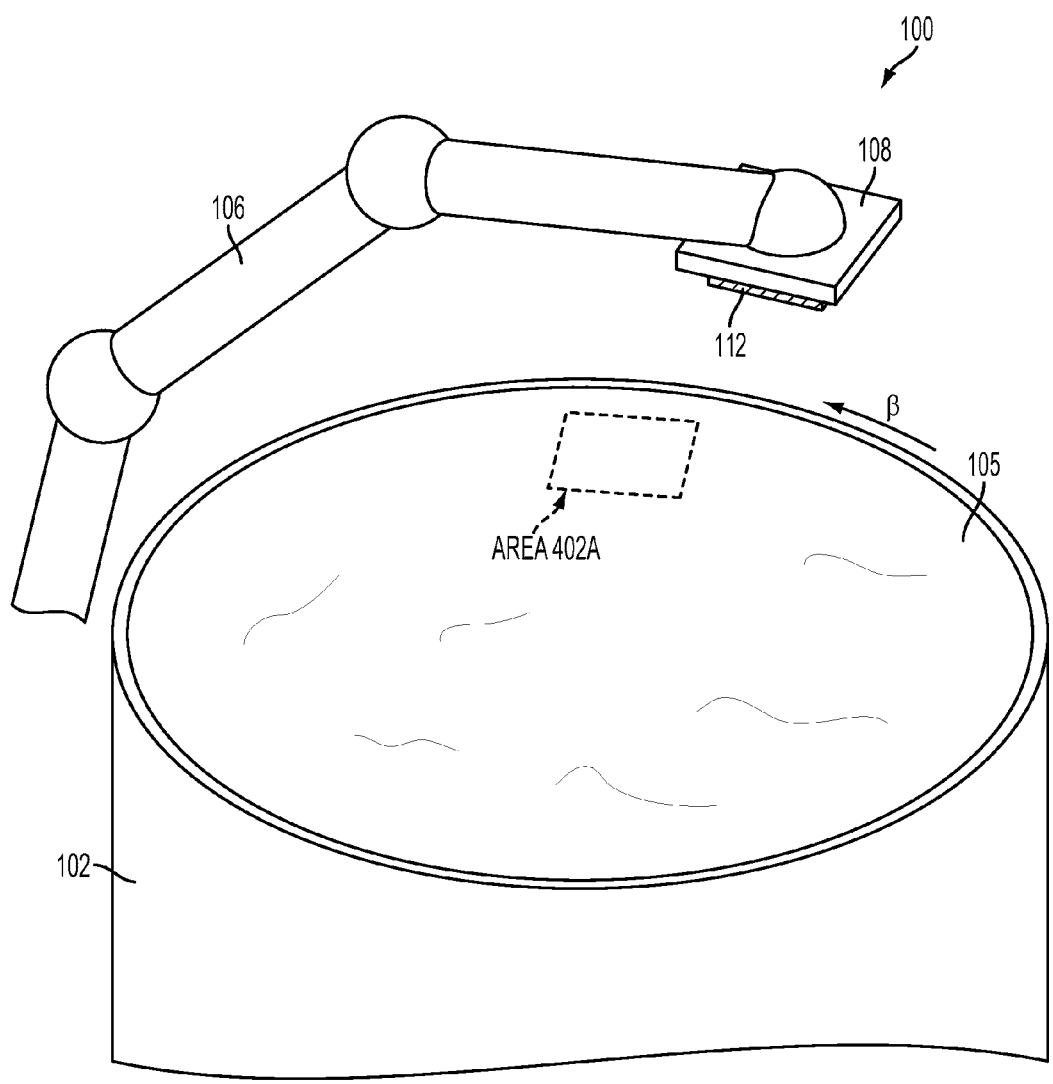

Consider FIG. 4C depicting movement of the resin container 102. The resin container 102 is shown to rotate by an angle β (e.g., smaller than angle γ illustrated in FIGS. 3A-3G) about the center of the resin container 102. As shown in FIG. 4C, movement of the resin container 102 may result in area 402A moving to a different location relative to the base plate 108. More specifically, the area 402A may no longer be positioned directly under the base plate 108. Rather, area 402A is may now be positioned partially under the base plate 108. Additionally, such movement of the resin container 102 may allow the next layer to form in an area that partially overlaps with area 402A.

Figure 4D:
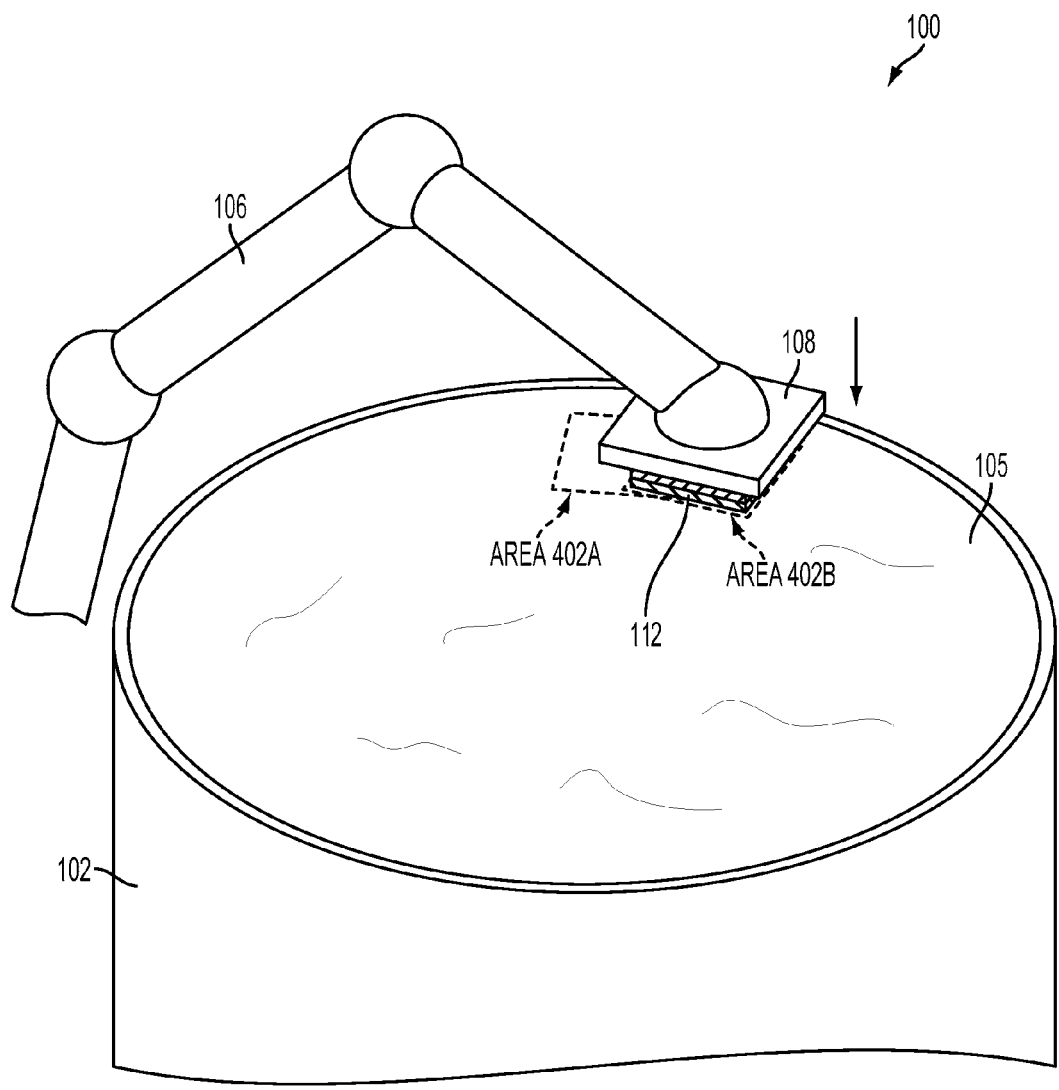

FIG. 4D depicts formation of the second layer of the 3D structure 112. In particular, after movement of the resin container 102, control signals may cause the robotic arm 106 to move the base plate 108 such that the second layer may form in an area 402B that partially overlaps area 402A. Subsequently, the projector 104 (not shown in FIG. 4D) may project an image in the shape of area 402B onto the base plate 108 to result in formation of the second layer.

Figure 4E:
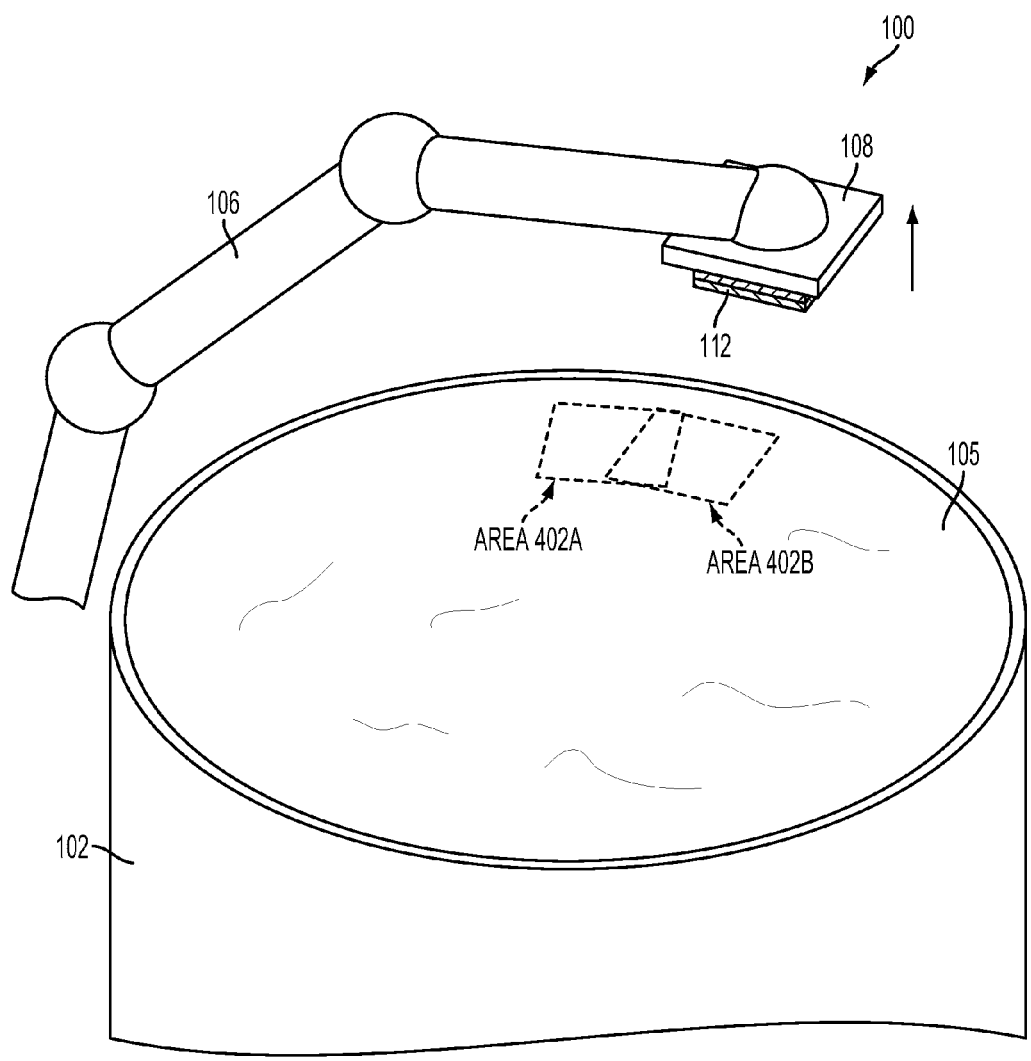
Figure 4F:
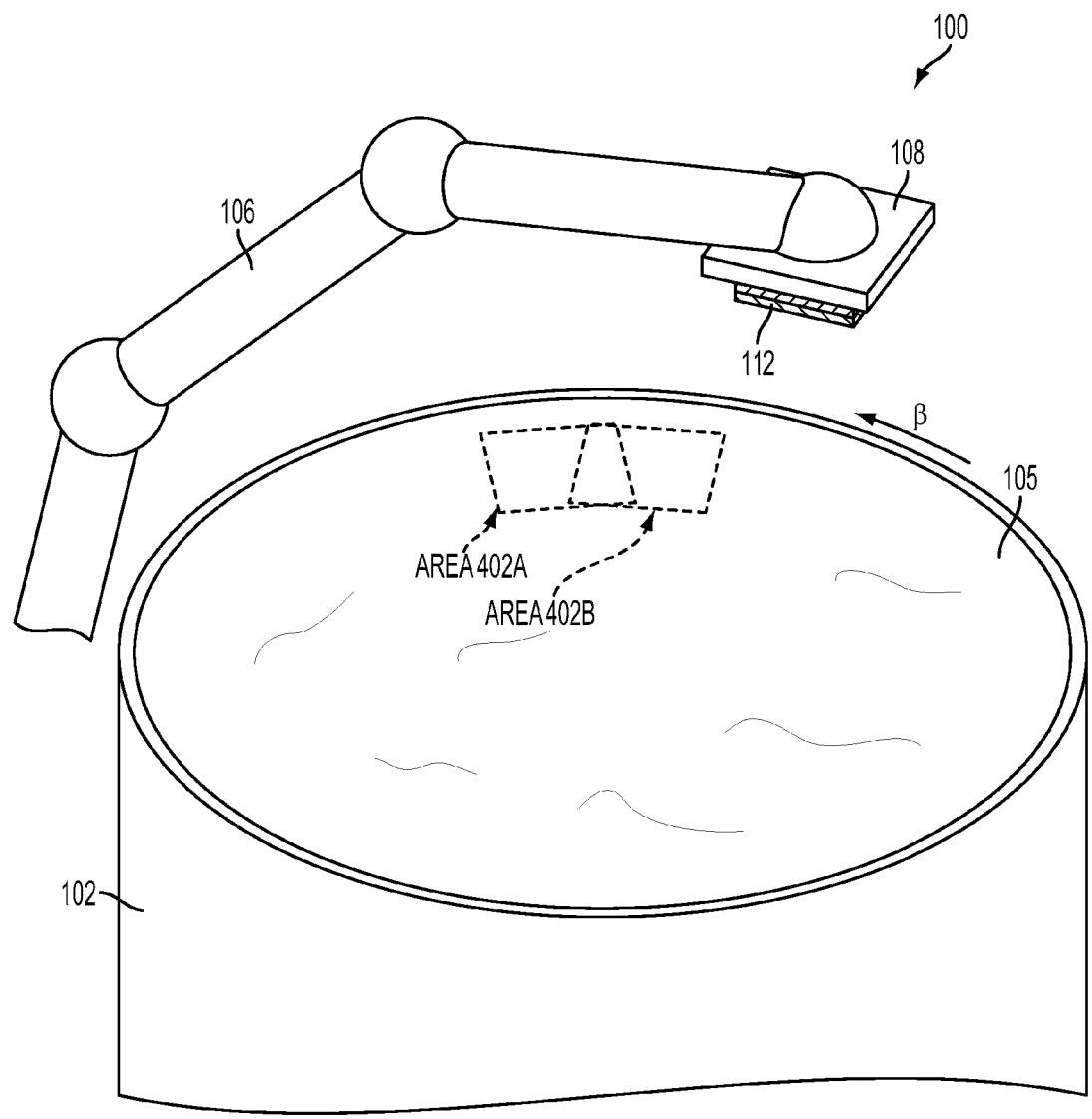
Figure 4G:
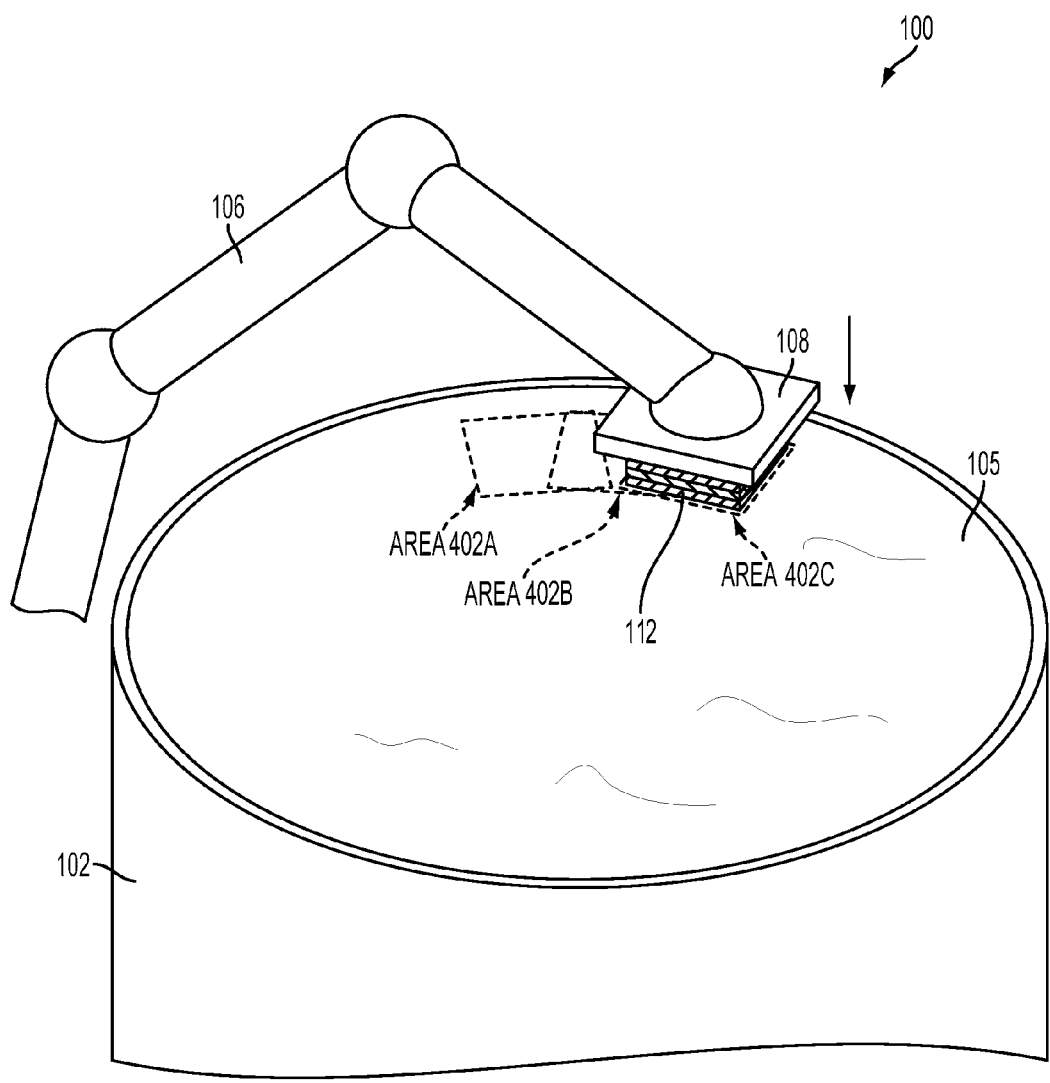

FIGS. 4E-4G illustrate formation of a subsequent layer (e.g., a third layer) after formation of the previous layers (e.g, the first and second layers). In particular, FIG. 4E depicts further movement of the robotic arm 106. As shown, the base plate 108 is lifted directly upward and area 402B is shown as positioned directly under the base plate 108 upon completion of the movement. After movement of the base plate 108, control signals may result in further movement of the resin container 102.

As shown in FIG. 4F, the resin container 102 may further rotate by angle β about the center of the resin container 102. Such movement of the resin container 102 may result in areas 402A and 402B to moving to a different location relative to the base plate 108. More specifically, the area 402A may no longer be positioned under the base plate 108 while area 402B is shown as positioned partially under the base plate 108. Additionally, movement of the resin container 102 may allow the subsequent layer to form in an area that partially overlap with areas 402B and does not overlap with area 402A. However, in another case, the subsequent layer may form in an area that partially overlaps with areas 402A and does not overlap with area 402B. In yet another case, the subsequent layer may form in an area that partially overlaps both areas 402A and 402B. Other cases may also be possible.

As shown in FIG. 4G, after movement of the resin container 102, control signals may cause the robotic arm 106 to move the base plate 108 such that the third layer may form in an area 402C that partially overlaps area 402B. Subsequently, the projector 104 (not shown in FIG. 3G) may project an image in the shape of area 402C onto the base plate 108 to result in formation of the third layer. As a result, each consecutive layer can form from resin 105 in an area of the resin container 102 that at least partially overlaps the area where the preceding layer was formed.

Notably, the sequence illustrated in FIGS. 4A-4G results in consecutive layers being printed in areas of the resin container 102 that are partially overlapping. This may allow for shorter movements of the resin container 102 between formation of layers while still stirring the entire (or part of the) volume of the liquid resin 105, thereby speeding up the 3D printing procedure.

Note that the first layer depicted in FIGS. 3A-4G may represent the first layer in of the 3D structure 112, or could have been formed after one or more previous layers that are not shown in FIGS. 3A-4G. Similarly, the third layer depicted in FIGS. 3A-4G may represent the final layer of the 3D structure 112, or could be followed by one or more subsequent layers that are not shown in FIGS. 3A-4G. Additionally, the example implementations disclosed herein may be used during formation of the entire 3D structure 112 or during formation of part of the 3D structure 112.

Further, the example implementations disclosed herein are not limited to an arrangement where a base plate is coupled to a robotic arm. Another example arrangement may include a 3D printer that may be configured for stereolithography using a base plate that is only movable upwards and downwards (i.e., with one degree of freedom).

Figure 5:
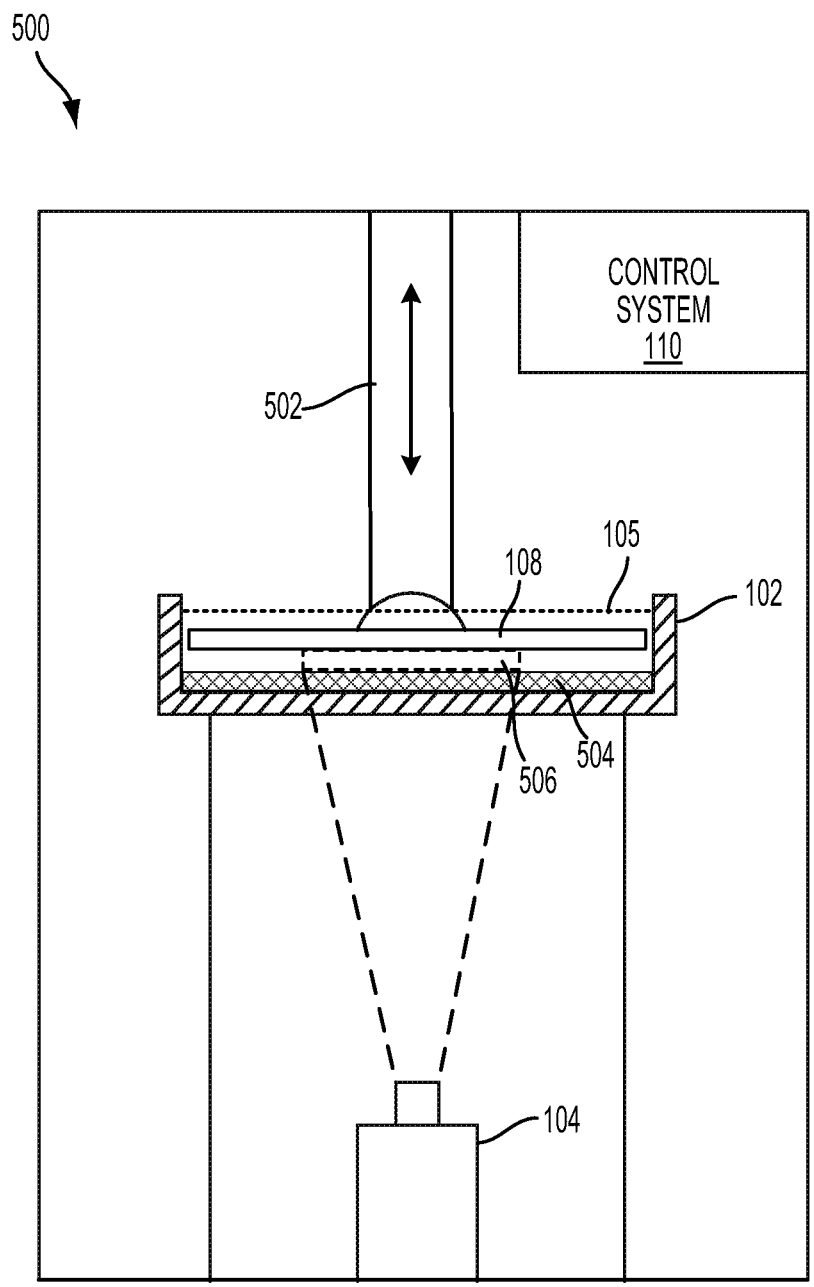
FIG. 5 illustrates another 3D printer system, according to an example embodiment.

To illustrate, consider FIG. 5 showing another 3D printer 500, according to an example embodiment. 3D printer 500 includes a base plate mechanism 502 that is operable to move the base plate 108 upwards and downwards (i.e., with one degree of freedom). In this arrangement, the base plate mechanism 502 may be configured (e.g., based on instructions from control system 110) to move the base plate 108 upwards after formation of each layer such that the structure is no longer in contact with the resin. Additionally, the base plate mechanism 502 may be configured to move the base plate 108 downward after rotation of the resin container 102 to proceed with formation of the subsequent layer.

3D printer 500 also includes a membrane 504 on the bottom of the resin container 102. The membrane 504 may be formed from material that allows UV radiation from the light source 104 to pass through to the liquid resin 105. For example, membrane 504 may be formed from a layer of clear or semi-transparent material such as Polydimethylsiloxane (PDMS).

To print each layer 506 of a 3D structure, the base plate 108 may be positioned in the liquid resin 105, above the membrane 504. More specifically, the base plate 108 may be positioned such that the distance between the bottom of the base plate 108 and the top of membrane 504 is equal or perhaps slightly greater than the desired height of the layer 506 being cured (e.g., 1 mm or slightly greater than 1 mm, if a layer of 1 mm is desired). A layer 506 of the 3D object may then be formed by exposing the liquid resin 105 between base plate 108 and membrane 504 to UV radiation from light source 104.

Additionally, repeatedly curing at the same location may result in degradation of the membrane 504. In particular, the internal temperature of PDMS membrane may increase at a certain location of the membrane due to repeated curing. When the temperature of PDMS membrane increases, it may become more difficult to remove cured resin from the PDMS membrane. As a result, pulling a layer 506 off of the membrane 504 after repeated curing at a certain location may degrade the membrane 504 at that location.

Further, exposing the liquid resin 105 between base plate 108 and membrane 504 to UV radiation from light source 104 may result in overspill of UV radiation (e.g., via a gap between the base plate 108 and walls of the resin container 102) onto areas of the liquid resin 105 where the 3D structure is not being formed (e.g., above the base plate 108). Such overspill while repeatedly curing at the same location may result in degradation of the liquid resin 105 at areas of the resin container that are yet to be used for formation of layers.

Rotation of the resin container 102 between formation of layers may eliminate (or reduce) degradation of the membrane 504 and/or eliminate (or reduce) degradation of the resin 105 due to overspill of UV radiation. In one example, such rotation of the resin container 102 may reduce repeated curing at the same location of the membrane 504, thereby reducing degradation of the membrane 504. In another example, such rotation of the resin container 102 may avoid uneven degradation of the membrane 504, thereby reducing non-uniformity during formation of layers. In yet another example, such rotation of the resin container 102 may reduce repeated overspill of UV radiation onto the same areas of the resin container 102, thereby reducing degradation of the liquid resin 105 at areas of the resin container that are yet to be used for formation of layers. Other examples may also be possible.

Note that, in some embodiments, membrane 194 may be formed from Teflon or other similar materials, such as Polymethylpentene film, instead of from PDMS. Teflon has similar adhesive characteristics as PDMS; e.g., cured resin does not significantly adhere to either material, which thus allows for cured resin to be easily removed from the membrane once a layer is complete. However, Teflon tends to dissipate heat more efficiently than PDMS. As a result, the internal temperature of PDMS membrane may increase more during the course of a 3D printing process, than the internal temperature of Teflon membrane does during a comparable 3D printing process. As mentioned above, when the temperature of PDMS membrane increases, it may become more difficult to remove cured resin from the PDMS membrane. Therefore, Teflon may allow for cleaner separation of a cured resin layer from the membrane.

Additionally, note that base plate 108, resin 105, resin container 102, light source 104, and/or control system 110 shown in FIG. 5 may be the same as or different from the like-numbered aspects shown in FIG. 1A. Further, note that in some implementations 3D printer 500 may be configured for stereolithography using a base plate that is movable with two degrees of freedom; e.g., vertically movable (i.e., upwards and downwards) and horizontally movable (e.g., parallel to the surface of the resin in the resin container).

Yet another example arrangement (not shown) may include, for instance, a base plate that is coupled to a platform and submerged in the resin. This arrangement may also include a projector positioned above the resin container and the base plate may descend after formation of each layer such that each layer forms on top of a preceding layer. Given this arrangement, the resin container may be configured to move (e.g., rotate) relative to the base plate between formation of one or more layers. Other example arrangements may also be possible.

In the illustrated examples of FIGS. 3A-3G, the area where each layer is formed does not overlap with the area where the previous layer was formed. Whereas, in the illustrated examples of FIG. 4A-4G, the area where each layer is formed partially overlaps with the area where the previous layer was formed. However, in another example implementation, the area where each layer is formed may be adjacent to the area where the previous layer was formed. In particular, the edges of consecutive areas may be in contact without any overlap of the areas. Other examples may also be possible.

In another aspect, an example implementation may involve some pairs of consecutive layers forming in areas that partially overlap, some pairs of consecutive layers forming in areas that do not overlap, and/or some pairs of consecutive layers forming in areas that are adjacent. Moreover, some layers may form in areas that completely overlap an area where one or more previous layers have been formed. For example, a first layer may form in a particular area of the resin container 102 and subsequent layers may form in areas that are different (e.g., partially overlapping, non-overlapping, and/or adjacent) from the area where the first layer was formed. However, the final layer may form in an area that completely overlaps the area where the first layer was formed. Such a scenario may occur, for instance, after a circular resin container completes a full revolution during formation of the 3D structure. Other examples may also be possible.

In yet another aspect, the illustrated examples of FIGS. 3A-4G show the amount of rotation after formation of each layer as constant. However, the 3D printer may vary the amount of rotation after formation of different layers. Further, the areas 302A-302C and 402A-402C area are shown as being of the same size. However, an area may also differ in size relative to other areas. In particular, depending on the shape of the 3D structure being formed, each layer of the structure may vary in size and shape. As a result, the size and shape of the area where a layer is formed may depend on the size and shape of the layer.

In this manner, the amount of rotation after formation of each layer may also be based at least in part on the size and shape of the areas. For instance, the 3D printer system 100 may determine that the formation of a subsequent layer should be in an area that does not overlap with the area where a preceding layer was formed. Given such a determination, the amount of rotation after formation of the preceding layer may depend on the size of that layer. That is, if the preceding layer is large then a large amount of rotation of the resin container 102 may be needed such that the subsequent layer can form in an area that does not overlap. Whereas, if the preceding layer is small then a small amount of rotation of the resin container 102 may be needed such that the subsequent layer can form in an area that does not overlap.

In yet another aspect, the 3D printer system 100 may form multiple layers between each movement of the resin container 102. For example, the 3D printer system 100 could move the resin container 102 after formation of every two layers, or after formation of every third layer, among other possibilities. This may decrease the number of movements of the resin container 102 between formation of layers, thereby speeding up the 3D printing procedure while still stirring the entire (or part of the) volume of the liquid resin 105 when necessary.

In another implementation, the area of the resin container 102 that is cured may be varied by moving the base plate 108 with respect to the resin container 102 between formation of layers. In such an implementation, the projector 104 may also be coupled to a mechanical system. This mechanical system could optionally move the projector 104 along with the base plate 108, such that as the base plate 108 moves, the projector 104 remains in the same position relative to the base plate 108. Additionally, in such an implementation, the resin container 102 may remain fixed while the base plate 108 and/or the projector 104 move. Alternatively, the resin container 102 may move simultaneously along with movement of the base plate 108 and/or the projector 104. Other examples may also be possible.

In either case, the 3D printer system 100 could employ more sophisticated logic to intelligently move the resin container 102 and/or the base plate 108, in an effort to optimize use of the surface area of the resin container 102 (e.g., a surface area at any depth of the resin 105 in the resin container 102). In particular, the 3D printer system 100 may be configured to reduce (and possibly minimize) the re-use of the surface area during formation of the 3D structure 112. For instance, after the 3D printer system 100 forms each layer (or a set of layers), the control system 110 could dynamically determine movement of the resin container 102 and/or the base plate 108 relative to one another in an effort to more evenly utilize the entire surface area of the resin container 102.

For instance, the control system 110 could keep track of the usage across the surface area of the resin container 102. In particular, the control system 110 may track the total light exposure time at a given location or area of the resin container 102 as well as light exposure intensity at the given location or area of the resin container 102, among other possibilities. Additionally, the control system 110 may also take into account the number of layers remaining to be formed, the size of the layers to be formed, and/or the shape of the layer to be formed. Further, the control system 110 may also take into account the amount of light exposure needed for formation of each of the layers to be formed.

As such, the control system 110 may be configured to use this information to determine movements of the resin container 102 and/or base plate 108 that distribute exposure time and/or the amount of light exposure throughout the surface area of the resin container 102 (and/or surface area of the membrane 504). For example, the control system 100 may use the information to determine whether a layer should be formed in an area that (i) at least partially overlaps an area where a previous layer was formed, (ii) does not overlap an area where a previous layer was formed, or (iii) is adjacent to an area where a previous layer was formed. Other examples may also be possible.

In a further aspect, the 3D printer system 100 may include a database where information related to formation of each structure is stored. Such information may include: size of the structure, shape of the structure, number of layers for formation of the structure, formation time per layer, and/or usage of the surface area of the resin container (and/or surface area of the membrane 504), among others. Various machine learning techniques may then be used by taking this information into account during future formation of similar structures in order to optimize usage of the surface area of the resin container as well as speed up the 3D printing procedure.

In yet a further aspect, the 3D printer system 100 may vary the movement of the resin container 102 throughout the 3D printing procedure. Varying the movement of the resin container 102 may involve varying the duration of time that the resin container 102 moves between formation of layers. Additionally or alternatively, varying the movement of the resin container 102 may involve changing the type of movement. Types of movement of the resin container 102 may involve: rotation of the container (e.g., a full revolution or half a revolution), side to side movement of the container, and up and down movement of the container, among other options. In this manner, varying the movement of the resin container 102 may vary the degree of agitation of the resin 105.

For instance, movement of the resin container 102 may vary from start to finish of the 3D printing procedure. In one case, variation in movement of the resin container 102 may be pre-determined. For example, the duration of movement (e.g., between formation of layers) may increase over time, such as by increasing linearly or exponentially throughout the 3D printing procedure. In another case, variation in movement of the resin container 102 may depend on the progress of the 3D structure 112. For example, the duration of movement may increase discretely as the progress of forming the 3D structure 112 exceeds various threshold (e.g., increasing duration of movement between formation of layers when the structure is 25% complete). In yet another case, variation in movement of the resin container 102 may depend on the amount of light exposure. For example, the duration of movement may increase as the total amount of light exposure accumulates during formation of the 3D structure 112.

In another instance, movement of the resin container 102 may vary on a layer by layer basis. In particular, variation in movement of the resin container 102 after formation of a particular layer (or set of layers) may depend on factors associated with the formation of that particular layer (or set of layers). In one case, assuming formation of multiple layers, variation in movement may depend on the number of layers formed. For example, the higher the number of layers that have been formed, the longer the duration of movement of the resin container 102 may be after formation of those layers. In another case, formation of each layer may involve a different amount of light exposure. In this case, variation in movement after formation of a particular layer may depend on the amount of light exposure involved in formation of that particular layer. For example, the higher the amount of light exposure used for formation of a layer, the longer the duration of movement of the resin container 102 may be following formation of that layer.

In yet another instance, at a particular point in time, the control system 110 may determine that formation of the 3D structure 112 is incomplete. However, the control system 110 may also determine that every part of the surface area of the resin container 102 has been used during formation of the 3D structure 112 at that particular point in time. As a result, re-use of at least part of the surface area of the resin container 102 may be needed for the remaining formation of the 3D structure 112.

Upon determining re-use of at least part of the surface area of the resin container 102, the control system 110 may send signals to vary the movement of the resin container 102. In one example, prior to moving to a position where a subsequent layer can be formed (e.g., in a re-used area), a circular resin container may complete a full revolution after completion of the preceding layer. In another example, prior to moving to a position where a subsequent layer can be formed (e.g., in a re-used area), the resin container 102 may move in a side to side motion after completion of the preceding layer. In this manner, movement of the resin container 102 may vary in duration and/or type of movement upon determining that re-use of at least part of the surface area of the resin container 102 is needed. Other instances may also be possible.

In some implementations, settings associated with shifting of the curing location may be customizable by a user of the 3D printer system 100. In particular, the 3D printer system 100 may receive input from a user of the system such as by way of the Graphical User Interface (GUI) 152 in order to select various settings for shifting the curing location during the 3D printing procedure.

In one example, the system may receive input to enable or disable shifting of the curing location. Additionally or alternatively, the system may receive input to select between shifting of the curing location and use of a scraper. In another example, the system may receive input to select a number of layers to be formed between each shift of the curing location. In yet another example, the system may receive input including a selection for duration of time to form the object. For instance, the user may desire faster completion of the 3D structure 112. Thus, the system may receive input selecting fast completion of the 3D structure 112 (e.g., selected from several options indicating duration of time). Based on such a selection, the system may determine a setting for shifting the curing location. Such a setting may involve shifting of the curing location on a less frequent basis in order to speed up completion of the 3D structure 112. Other example user-customizable settings may also be possible.

Moreover, the 3D printer system 100 may allow for creation of user-accounts that may be associated with various users of the system. The user-customizable settings may then be stored and associated with corresponding user-accounts. In this manner, the 3D printer system 100 can form 3D structures at a future time based on settings and preferences previously selected by the user associated with a particular user-account.

As mentioned above, GUI 160 may provide a 3D rendering window of the 3D model and robotic arm 106, which is updated throughout the 3D printing procedure to show the current status of the procedure. In a further aspect, GUI 160 may also provide indicators associated with the functions of shifting the curing location.

In one example, GUI 160 may provide a sign (e.g., an image or text etc.) indicating whether or not the system is currently in the process of shifting the curing location. In another example, GUI 160 may provide data such as: the number of times the curing location has shifted during a current procedure, total duration per shift, and/or a number of shifts remaining, among other options.

In yet another example, GUI 160 may provide a model of the surface area of the resin container 102. Such a model may dynamically update to show use (e.g., light exposure) of the surface area over time. For instance, the model may show the areas where layers of the "in-progress" 3D structure 112 have been cured thus far. Additionally, the model may show a current curing location of the system. Further, the model may show future curing locations (e.g., the next curing location) during the procedure of forming the structure. Other examples may also be possible.

VI. Conclusion

The present disclosure is not to be limited in terms of the particular implementations described in this application, which are intended as illustrations of various aspects. Many modifications and variations can be made without departing from its spirit and scope, as will be apparent to those skilled in the art. Functionally equivalent methods and apparatuses within the scope of the disclosure, in addition to those enumerated herein, will be apparent to those skilled in the art from the foregoing descriptions. Such modifications and variations are intended to fall within the scope of the appended claims.

The above detailed description describes various features and functions of the disclosed systems, devices, and methods with reference to the accompanying figures. In the figures, similar symbols typically identify similar components, unless context dictates otherwise. The example implementations described herein and in the figures are not meant to be limiting. Other implementations can be utilized, and other changes can be made, without departing from the spirit or scope of the subject matter presented herein. It will be readily understood that the aspects of the present disclosure, as generally described herein, and illustrated in the figures, can be arranged, substituted, combined, separated, and designed in a wide variety of different configurations, all of which are explicitly contemplated herein.

The particular arrangements shown in the figures should not be viewed as limiting. It should be understood that other implementations can include more or less of each element shown in a given figure. Further, some of the illustrated elements can be combined or omitted. Yet further, an example implementation can include elements that are not illustrated in the figures.

While various aspects and implementations have been disclosed herein, other aspects and implementations will be apparent to those skilled in the art. The various aspects and implementations disclosed herein are for purposes of illustration and are not intended to be limiting, with the true scope being indicated by the following claims.

We claim:

1. A method for printing a three-dimensional (3D) structure comprising:
   controlling, by a computing system, an articulated robotic arm associated with a 3D printer to insert a base plate through a resin surface in a first area of a resin container;
   controlling, by the computing system, the 3D printer to form a first layer of the 3D structure on the base plate using one or more light sources that are operable to emit radiation that cures resin;
   after formation of the first layer, controlling, by the computing system, the articulated robotic arm associated with the 3D printer to lift the base plate and the first layer through the resin surface in the first area of the resin container, then moving the resin container with respect to the base plate;
   controlling, by the computing system, the articulated robotic arm associated with the 3D printer to insert the base plate through a resin surface of a second area of the resin container that is at least partially non-overlapping with the first area; and
   controlling, by the computing system, the 3D printer to form a second layer of the 3D structure adjacent to the first layer of the 3D structure using one or more of the light sources that are operable to emit radiation that cures resin.

2. The method of claim 1, wherein the one or more light sources are arranged below the resin container.

3. The method of claim 1, wherein moving the resin container comprises rotating the resin container.

4. The method of claim 3, wherein the resin container comprises a circular resin container, and wherein rotating the resin container comprises rotating the circular resin container about the center of the circular resin container.

5. The method of claim 1, wherein the first area and the second area do not overlap.

6. The method of claim 1, comprising dynamically determining an amount by which to move the resin container with respect to the base plate.

7. The method of claim 6, wherein the amount by which to move the resin container with respect to the base plate varies from layer to layer.

8. A non-transitory computer-readable medium storing software comprising instructions executable by one or more computers which, upon such execution, cause the one or more computers to perform operations comprising:
   controlling, by a computing system, an articulated robotic arm associated with a 3D printer to insert a base plate through a resin surface in a first area of a resin container;
   controlling, by the computing system, the 3D printer to form a first layer of the 3D structure on the base plate using one or more light sources that are operable to emit radiation that cures resin;
   after formation of the first layer, controlling, by the computing system, the articulated robotic arm associated with the 3D printer to lift the base plate and the first layer through the resin surface in the first area of the resin container, then moving the resin container with respect to the base plate;
   controlling, by the computing system, the articulated robotic arm associated with the 3D printer to insert the base plate through a resin surface of a second area of the resin container that is at least partially non-overlapping with the first area; and
   controlling, by the computing system, the 3D printer to form a second layer of the 3D structure adjacent to the first layer of the 3D structure using one or more of the light sources that are operable to emit radiation that cures resin.

9. The medium of claim 8, wherein the one or more light sources are arranged below the resin container.

10. The medium of claim 8, wherein moving the resin container comprises rotating the resin container.

11. The medium of claim 10, wherein the resin container comprises a circular resin container, and wherein rotating the resin container comprises rotating the circular resin container about the center of the circular resin container.

12. The medium of claim 8, wherein the first area and the second area do not overlap.

13. The medium of claim 8, wherein the operations comprise dynamically determining an amount by which to move the resin container with respect to the base plate.

* * * * *